US011052316B2

(12) United States Patent
Wang et al.

(10) Patent No.: US 11,052,316 B2
(45) Date of Patent: Jul. 6, 2021

(54) METHOD AND APPARATUS FOR GENERATING IMAGE PARAMETER FOR REPRODUCIBLE VIRTUAL CHARACTER

(71) Applicant: BEIJING XIAOMI MOBILE SOFTWARE CO., LTD., Beijing (CN)

(72) Inventors: Gaoyu Wang, Beijing (CN); Maohua Zhou, Beijing (CN); Hong Zhu, Beijing (CN); Lei Xiong, Beijing (CN); Di Pan, Beijing (CN); Chan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/819,034

(22) Filed: Mar. 13, 2020

(65) Prior Publication Data

US 2020/0298120 A1    Sep. 24, 2020

(30) Foreign Application Priority Data

Mar. 20, 2019 (CN) .......................... 201910211241.3

(51) Int. Cl.
*A63F 13/57* (2014.01)
(52) U.S. Cl.
CPC .................... *A63F 13/57* (2014.09)
(58) Field of Classification Search
CPC .. A63F 13/57; A63F 13/58; A63F 2300/6607; A63F 2300/6615; A63F 2300/6623
USPC .......................................................... 463/31
See application file for complete search history.

(56) References Cited

U.S. PATENT DOCUMENTS

| 7,025,675 | B2* | 4/2006 | Fogel | A63F 13/12 463/9 |
| 7,806,758 | B2* | 10/2010 | Van Luchene | A63F 13/12 463/1 |
| 8,251,810 | B2* | 8/2012 | Van Luchene | A63F 13/822 463/29 |
| 2007/0298866 | A1* | 12/2007 | Gaudiano | A63F 13/00 463/23 |
| 2008/0318678 | A1* | 12/2008 | Stivoric | A61B 5/1123 463/36 |

(Continued)

FOREIGN PATENT DOCUMENTS

| CN | 109126136 A | 1/2019 |
| JP | 2002139987 A | 5/2002 |

OTHER PUBLICATIONS

Extended European search report of counterpart EP application No. 20162407.9 dated Jul. 6, 2020.

(Continued)

*Primary Examiner* — Allen Chan
(74) *Attorney, Agent, or Firm* — Syncoda LLC; Feng Ma

(57) ABSTRACT

A method for generating an image parameter for a reproducible virtual character includes: receiving a trigger signal for generating a virtual character; acquiring a generation rule of an image parameter of the virtual character, the image parameter comprising n characteristic parameters configured to indicate an image of the virtual character; and generating a gene sequence of an $i^{th}$ characteristic parameter in the n characteristic parameters according to the generation rule.

20 Claims, 8 Drawing Sheets

(56) References Cited

U.S. PATENT DOCUMENTS

2012/0329561 A1* 12/2012 Evans .................... A63F 13/79
463/43
2013/0102379 A1   4/2013 Sargent et al.
2017/0080346 A1*  3/2017 Abbas .................... A63F 13/79
2019/0362531 A1* 11/2019 Smith .................... G16B 45/00

OTHER PUBLICATIONS

Karl Sims; Evolving virtual creatures, SIGGRAPH 94 Conference Proceedings; Jul. 24-29, 1994, Computer Graphics : Annual Conference Series ; 1994], [Orlando, Florida] ; Jul. 24, 1994 (Jul. 24, 1994), pp. 15-22, entire document.

* cited by examiner

METHOD AND APPARATUS FOR GENERATING IMAGE PARAMETER FOR REPRODUCIBLE VIRTUAL CHARACTER

CROSS-REFERENCE TO RELATED APPLICATION

This application claims priority to Chinese Patent Application 201910211241.3 filed on Mar. 20, 2019, the disclosure of which is hereby incorporated by reference in its entirety.

BACKGROUND

At present, some applications for raising and developing characters, such as virtual pets, are prevailing, and users may adopt virtual characters by using such applications, then raise and decorate the virtual characters for joy of raising the virtual characters.

SUMMARY

The present disclosure relates generally to the field of virtual environments, and more specifically to a method and apparatus for generating an image parameter for a reproducible virtual character.

The present disclosure provides a method and apparatus for generating an image parameter for a reproducible virtual character, and a storage medium thereof.

According to a first aspect of embodiments of the present disclosure, a method for generating an image parameter for a reproducible virtual character is provided. The method includes:

receiving a trigger signal for generating a virtual character, generation of the trigger signal being at least one of periodical generation and generation upon receipt of a generation request;

acquiring a generation rule of an image parameter of the virtual character, the image parameter including n characteristic parameters configured to indicate an image of the virtual character, n being an integer;

generating a gene sequence of an $i^{th}$ characteristic parameter in the n characteristic parameters according to the generation rule, the gene sequence including m genes, $m \geq 2$, $i \leq n$; and determining the image parameter of the virtual character according to the gene sequences of the n characteristic parameters.

According to a second aspect of embodiments of the present disclosure, an apparatus for generating an image parameter for a reproducible virtual character is provided. The apparatus includes:

a processor; and a memory for storing instructions executable by the processor;

wherein the processor is configured to:

receive a trigger signal for generating a virtual character, generation of the trigger signal being at least one of periodical generation and generation upon receipt of a generation request;

acquire a generation rule of an image parameter of the virtual character, the image parameter including n characteristic parameters configured to indicate an image of the virtual character, n being an integer;

generate a gene sequence of an $i^{th}$ characteristic parameter in the n characteristic parameters according to the generation rule obtained by the first acquiring module, the gene sequence including m genes, $m \geq 2$, $i \leq n$; and determine the image parameter of the virtual character according to the gene sequences of the n characteristic parameters generated by the generating module.

According to a third aspect of embodiments of the present disclosure, a non-transitory computer-readable storage medium is provided. The storage medium stores at least one instruction, at least one program, and a code set or instruction set, the at least one instruction, the at least one program, and the code set or instruction set are loaded and executed by the processor to perform the method for generating the image parameter for the reproducible virtual character as defined in the first aspect.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
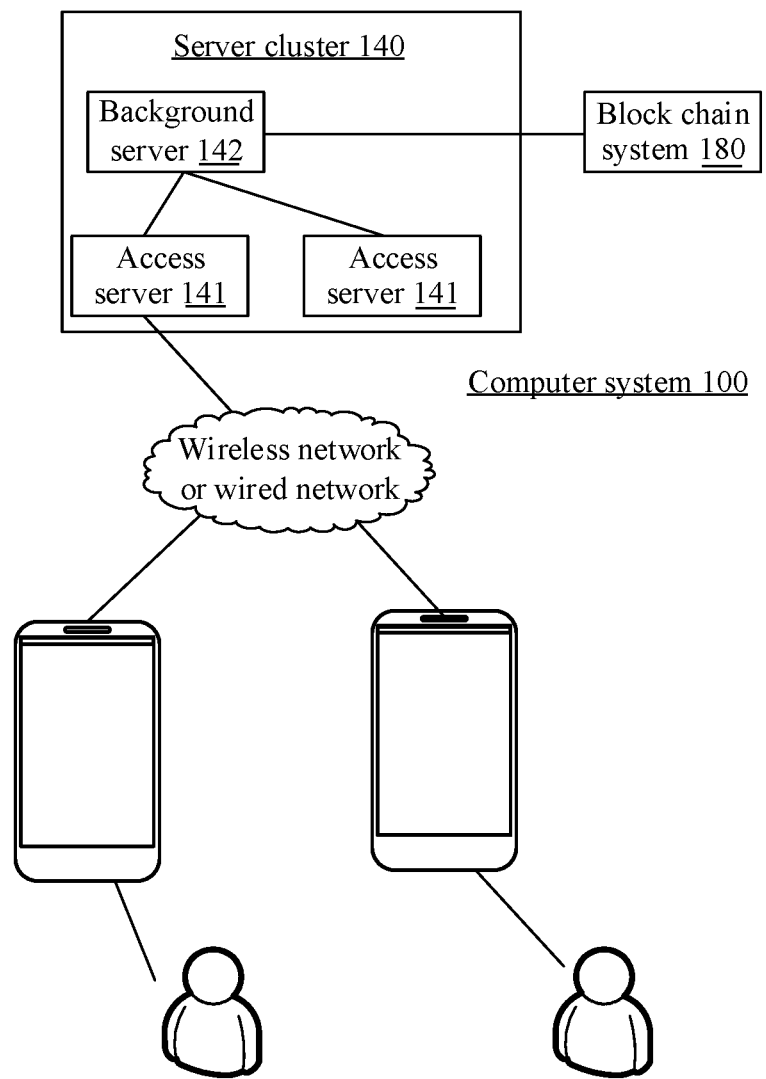
FIG. 1 is a structural block diagram of a computer system according to some embodiments.

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present invention. Rather, they are merely examples of devices and methods consistent with certain aspects of the present invention as detailed in the appended claims.

The terms involved in the embodiments of the present disclosure are briefly introduced hereinafter.

Virtual character: refers to a set of unique image parameters that are stored in a computer. After the set of image parameters are processed by the computer, a digital character may be presented in an image of carton and/or animal. In the present disclosure, the process of generating a virtual character is essentially a process of generating an image parameter for the virtual character in the computer. Hereinafter relevant description is given using the case where the virtual character is a virtual pet as an example.

The virtual pet is a two-dimensional digital pet or a three-dimensional digital pet. For example, the virtual pet is a three-dimensional virtual pet that is presented in the form of a carton rabbit. In some implementations, each virtual pet has a unique image parameter. The image parameter includes n characteristic parameters that are intended to indicate an image of the virtual pet, and each characteristic parameter includes a gene sequence. The gene sequence herein includes m genes, wherein m≥2. In some implementations, each gene sequence includes one dominate gene and at least one recessive gene. The dominate gene is a gene that determines a trait exhibition of the virtual pet, and the recessive gene is a gene that fail to independently determine the trait exhibition of the virtual pet.

In some implementations, in the embodiments, different generation rules may be defined for virtual pets with different inter-generations. The intergeneration is intended to a seniority of a virtual pet in the virtual pet world. For example, with respect to a virtual pet with intergeneration being 0, the generation rule is randomly generating the virtual pet. That is, the virtual pets of generation 0 are randomly generated. With respect to the virtual pets with intergeneration being greater than or equal to 1, the generation rule is generating the virtual pets according to father virtual pets and mother virtual pets and according to a genetic inheritance rule. That is, the following generations of virtual pets except the virtual pets of generation 0 are all generated according to the genetic inheritance rule.

In some embodiments, pet information of each virtual pet is stored in a block chain system, and is stored and authenticated according to a co-identification mechanism of a plurality of nodes on the block chain system. The pet information at least includes a unique image parameter of the virtual pet, and further optionally includes at least one of: an identifier of the virtual pet, father and mother information of the virtual pet, intergeneration information of the virtual pet, genealogical information of the virtual pet, history transaction records of the virtual pet, history event information of the virtual pet, match result information of the virtual pet, and other information of the virtual pet. Since the image parameter of each virtual pet is unique, and the information stored in the block chain system is real and unique, the virtual pet has a collection attribute. In the meantime, since the pet information of the virtual pet is stored in the block chain system, even if the virtual pet is a digital pet designed for use in a first application, the virtual pet may also be conveniently used in a second application. The first application and the second application are different from each other.

In some embodiments, the virtual pet is a digital pet presented in an application that is running in a terminal. The application includes at least one of the following functions: capturing virtual pet, generating virtual pet, reproducing virtual pet, transacting virtual pet, taking matches with virtual pet, implementing augmented reality (AR) interaction with virtual pet, socially networking with virtual pet, and practicing AR education with virtual pet. In some other embodiments, the application is intended for acquisition, reproduction and/or transaction of the virtual pet based on the block chain system. In some other embodiments, the application is social networking game application based on geographical information. The social networking game application provides at least one of the functions of collecting, growing and/or matching with virtual pet.

In some embodiments, the application has the function of taking matches with the virtual pet. In this case, the image parameter may determine the characteristics of the virtual pet. The characteristic may include extrinsic characteristics and/or intrinsic characteristics.

The extrinsic characteristics may refer to characteristics reflecting the image of the virtual pet. In some implementations, the extrinsic characteristics may include body shape, body color, eye, eye color, pattern, pattern color, mouth, tool, and the like. For example, the extrinsic characteristics of the eyes may include evil eyes, justicial eyes, cross eyes, sleepy eyes, timid eyes, wronged eyes, and the like different shapes. Still for example, the extrinsic characteristic of the eye color may include bronze green, sunny orange, vermilion red, noctilucent green, vermilion red, *Cornus officinalis* pink, and the like different colors. Still for example, the extrinsic characteristics of the mouth may include happy mouth, round mouth, little tusks, little moustache, lovely lips, small tongue, and the like different shapes.

The intrinsic characteristics may refer to characteristics reflecting an intrinsic attribute of the virtual pet. For example, the intrinsic attributes may include an IO value, an attack value, a defense value, a psychic value, a magic value, a power value, an endurance value, a agility value, potentiality value, speed value, lifespan value, and the like different attributes.

Image parameter of a virtual pet: includes a set of characteristic parameters that are intended to representing an image of the virtual pet. The image of each virtual pet includes a plurality of types of image materials. Each type of image materials corresponds to a different part and/or color. Each image material corresponds to a material identifier. Each type of material identifiers may be considered as a dominant gene in a gene sequence of a characteristic parameter. Exemplarily, the image of a virtual pet at least includes seven image materials: body model, body color material, pattern material, pattern color material, eye material, eye color material, and mouth material. In some implementations, when the body model includes a tail and ears, the image of the virtual pet may further include a tail material and an ear material. The tail material is a characteristic intended to determine a tail model of the virtual pet. For example, when the image is an animal, the tail material is a long and thin tail, or a short and thick tail or a fluffy tail. In some implementations, the image of the virtual pet may further include a pendant material. The pendant material is a characteristic intended to determine a decoration of the virtual pet, including but not limited to at least one of backpack, glasses, handheld tool, waist belt, clothes, hat, shoes, and head ornament.

Correspondingly, the characteristic parameters include at least one of: a body shape characteristic parameter, a body color characteristic parameter, a pattern characteristic parameter, a pattern color characteristic parameter, an eye characteristic parameter, an eye color characteristic parameter, a mouth characteristic parameter, and a pendant characteristic parameter. Each characteristic parameter includes a gene sequence. The gene sequence may be represented by an array arranged in an order. Using the case where a gene sequence includes a dominant gene and three recessive genes as an example, the gene sequence is represented as Gene=(D0+[R1–R3]), wherein D0 represents the dominant gene, and R1–R3 represent the three recessive genes.

Genetic inheritance rule: is also referred to as an inheritance rule, a genetic algorithm or a genetic inheritance algorithm. Based on the genetic inheritance rule, images of father and mother virtual pets are passed to their following generations by simulating real biological genetic inheritance rule, such that images of child pets are generated. In some embodiments, to ensure that each virtual pet is a customized virtual pet that is unique, each virtual pet is assigned a unique image parameter. In some embodiments, according to the genetic inheritance rule, the images of the father and mother virtual pets are subjected to reorganization and deduplication, such that the generated child pet has a unique characteristic. The deduplication refers to a mechanism for regenerating an image parameter of the virtual pet if an image parameter that is the same as that of the existing virtual pet is generated during the inheritance process, and thus ensuring uniqueness of the image parameter of the virtual pet. In some implementations, since the genetic inheritance rule is totally based on simulation of the real biological inheritance rule, some restrictions such as long pregnancy periods and prohibition reproduction between close relatives, and the like are present in the reproduction process.

In the embodiments of the present disclosure, inheritance genes are present between the virtual pets which are involved in the inheritance. The inheritance gene refers to a gene that is passed from one inheritance source to an inheritance target in two virtual pets involved in the inheritance. When the gene is a dominate gene, the two virtual pets have the same image material. For example, these two virtual pets both have yellow eyes. Still for example, these two virtual pets both have wronged eyes and a small tongue. One inheritance gene or a plurality of inheritance genes may be provided, which is not limited in the embodiments of the present disclosure.

Intergeneration information of a virtual pet: refers to seniority information of the virtual pet in the whole virtual pet world. When the virtual pet is randomly generated by a server, the intergeneration information of the virtual pet is a fixed value; when the virtual pet is reproductively generated by a father virtual pet and a mother virtual pet, the intergenerational information of the virtual pet is determined by inter-generations of the father virtual pet and the mother virtual pet. In some embodiments, the intergeneration of the child virtual pet is obtained by adding one to a maximum intergeneration value in the father virtual pet and the mother virtual pet. For example, assuming that the father virtual pet is a virtual pet of generation 0, and the mother virtual pet is a virtual pet of generation 4, then the child virtual pet is the virtual pet of generation 5. In some embodiments, intergeneration of a primary generation virtual pet is the minimum. For example, the intergeneration of the primary generation virtual pet is 0. Intergeneration of a non-primary generation virtual pet is determined by inter-generations of a father virtual pet and a mother virtual pet thereof. Intergeneration of a child virtual pet reproductively generated by the father virtual pet and the mother virtual pet is higher than the intergeneration of the father virtual pet or the mother virtual pet. In one example, if a father virtual pet and a mother virtual pet only with the same intergeneration are allowed to reproductively generate a child virtual pet (that is, a next generation virtual pet), intergeneration of the child virtual pet is equal to intergeneration of the father virtual pet or the mother virtual pet plus 1. For example, the inter-generations of the father virtual pet and the mother virtual pet are both 1, the intergeneration of the child virtual pet is 2; and for another example, the father virtual pet and the mother virtual pet are both 0, the intergeneration of the child virtual pet is 1. In another example, if either a father virtual pet and a mother virtual pet with the same intergeneration are allowed to reproductively generate a child virtual pet (that is, a next generation virtual pet), or a father virtual pet and a mother virtual pet with different inter-generations are allowed to reproductively generate a child virtual pet, intergeneration of the child virtual pet is equal to the intergeneration which is higher among the father and mother virtual pets plus 1. For example, if the intergeneration of the father virtual pet is 0, and the intergeneration of the mother virtual pet is 2, the intergeneration of the child virtual pet is 3. In addition, a primary generation virtual pet is not reproductively generated by a father virtual pet and a mother virtual pet, but is randomly generated by a virtual pet system. Therefore, the primary generation virtual pet don't have the father virtual pet or the mother virtual pet, and even don't have other virtual pet whose seniorities are higher than and genetically correlated with the primary generation virtual pet.

It should be noted that a virtual pet may not include a gender characteristic, during reproduction of a child virtual pet from two virtual pets, the gender may be randomly defined between the two virtual pets. That is, the gender of one virtual pet is defined as female, and then the virtual pet is the mother virtual pet; and the gender of the other virtual pet is defined as male, and then the virtual pet is the father virtual pet. The virtual pet may be reproduced by a combination of the female character and male character.

In some implementations, each virtual pet may further include a gender characteristic. The gender characteristic may be randomly generated, or may be alternately decided in a generation sequence. Illustratively, the server generates fives virtual pets, and defines the gender characteristics according to the generation sequence as female, male, female, male and female.

Father image parameter: An image parameter of a father virtual pet is a father image parameter. The father image parameter includes n second characteristic parameters. Each second characteristic parameter includes one gene sequence. The gene sequence includes m genes, where m≥2.

Mother image parameter: An image parameter of a mother virtual pet is a mother image parameter. The mother image parameter includes n third characteristic parameters. Each third characteristic parameter includes one gene sequence. The gene sequence includes m genes, where m≥2.

FIG. 1 is a schematic structural block diagram of a computer system 100 according to some embodiments of the present disclosure. The computer system 100 includes a first terminal 120, a server cluster 140, and a second terminal 160.

The first terminal 120 is connected to the server cluster 140 over a wireless network or a wired network. The first terminal 120 may be at least one of a smart phone, a game console, a desktop computer, a tablet computer, an electronic-book reader, an MP3 player, an MP4 player, and a laptop portable computer. An application supporting virtual pets is installed and run on the first terminal 120 The application may be any one of a pet raise game application, an AR game application, and an AR education application. The first terminal 120 may be a terminal used by a first user, and the application in the first terminal 120 is logged in to with a first user account.

The first terminal 120 is connected to the server cluster 140 over a wireless network or a wired network.

The server cluster 140 includes at least one of one server, a plurality of servers, a cloud computing platform, and a virtualization center. The server cluster 140 is configured to provide background services for the application supporting virtual pets. In some implementations, the server cluster 140 shoulders primary calculation tasks, and the first terminal 120 and the second terminal 160 shoulder secondary calculation tasks; or the server cluster 140 shoulders secondary calculation tasks, and the first terminal 120 and the second terminal 160 shoulder primary calculation tasks; or the server cluster 140, the first terminal 120, and the second terminal 160 collaboratively perform collaborative calculation by a distributed computing architecture.

In some implementations, the server cluster 140 includes an access server 141 and a background server 142. The access server 141 is configured to provide access services and information receiving and transmission services for the first terminal 120 and the second terminal 160, and forward useful information between the terminals and the background server 142. The background server 142 is configured to provide background services of the applications, for example, at least one of game logic services, material providing services, virtual pet generation services, virtual pet transaction services, and virtual pet reproduction services. The background server 142 may include one or a plurality of servers. If the background server 142 includes a plurality of servers, at least two background servers 142 are configured to provide different services, and/or at least two background servers 142 are configured to provide the same services, which is not limited in the embodiments of the present disclosure.

An application supporting virtual pets is installed and run on the second terminal 160. The application may be any one of a pet raise game application, an AR game application, and an AR education application. The second terminal 160 is a terminal used by a second user. The application on the second terminal 160 is logged in to with a second user account.

In some implementations, the first user account and the second user account are in the same virtual social network. In some implementations, the first user account and the second user account may belong to the same team, the same organization, or have a friendship or temporary communication authority. In some implementations, the first user account and the second user account may belong to different teams, different organizations, or two opponent teams.

In some implementations, the same application or the same type of applications based on different control system platforms may be installed on the first terminal 120 and the second terminal 160. The first terminal 120 may generally refer to one of a plurality of terminals, and the second terminal 160 may generally refer to one of a plurality of terminals. This embodiment is described using the first terminal 120 and the second terminal 160 as examples. Hereinafter, the embodiments are described using the case where the first terminal 120 and/or the second terminal 160 is a smart phone as an example.

A person skilled in the art may appreciate that the number of terminals may be larger or smaller. For example, the above terminals can be only one, or the above terminals can be dozens or hundreds, or more. The number of terminals and the type of devices are not limited in the embodiments of the present disclosure.

Figure 2:
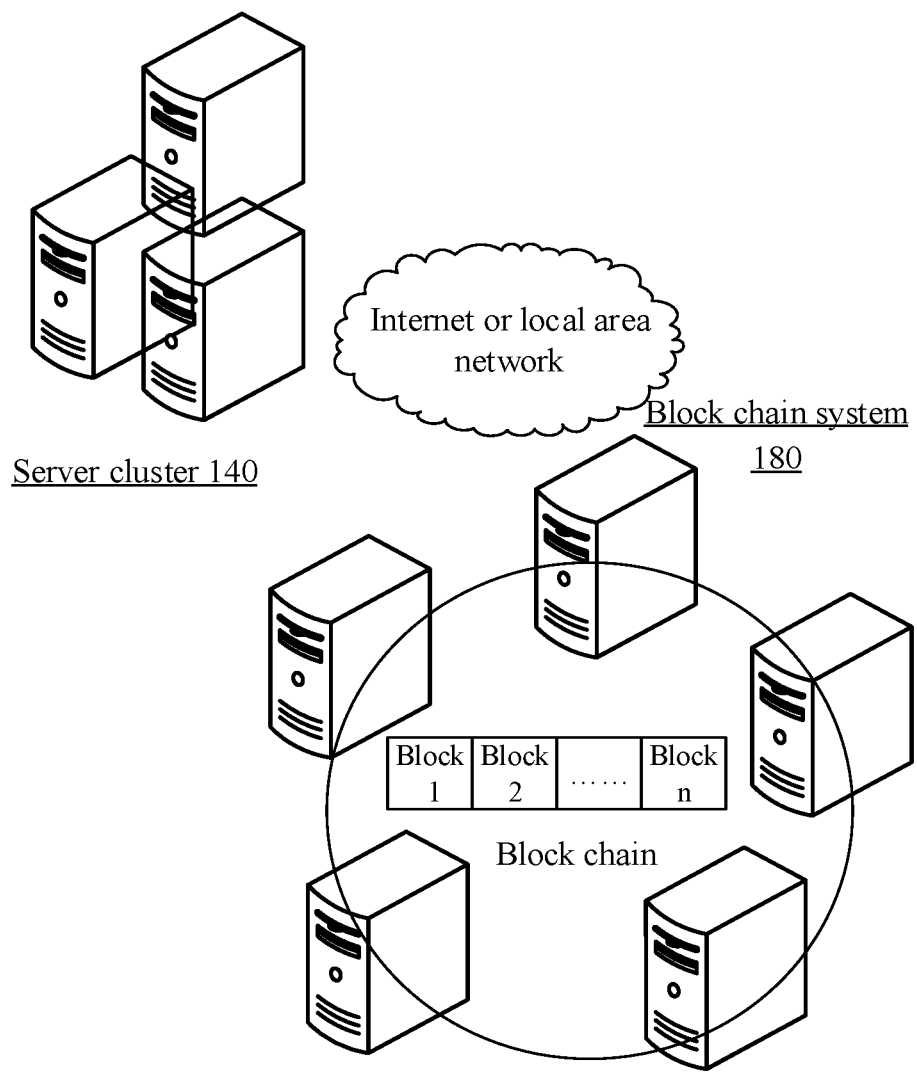
FIG. 2 is a structural block diagram of a server system according to some embodiments.

In some optional embodiments, the server cluster 140 is configured to store character information and transaction records of various virtual characters. The character information includes at least one of character identifiers that uniquely identifying virtual pets, image parameters that characterize character images of the virtual pets, and preview images characterizing the virtual pets. In an optional embodiment as illustrated in FIG. 2, the server cluster 140 is also connected to a block chain system 180, and the server cluster 140 stores character information and/or transaction records of various virtual pets in the block chain system 180. In some optional embodiments, the server cluster 140 itself may be used as a node in the block chain system 180 for running and storing data.

Since the block chain technology has the characteristics of transparency and decentralization, when the character information and/or the transaction records of the virtual pets are stored in the block chain system 180, it can be ensured that each virtual pet is unique, irreproducible and indestructible. That is, once a user owns a virtual pet, the virtual pet can't be cloned, modified, or destroyed by others. In other words, the virtual pet features uniqueness, rarity, and collection worth.

Figure 3:
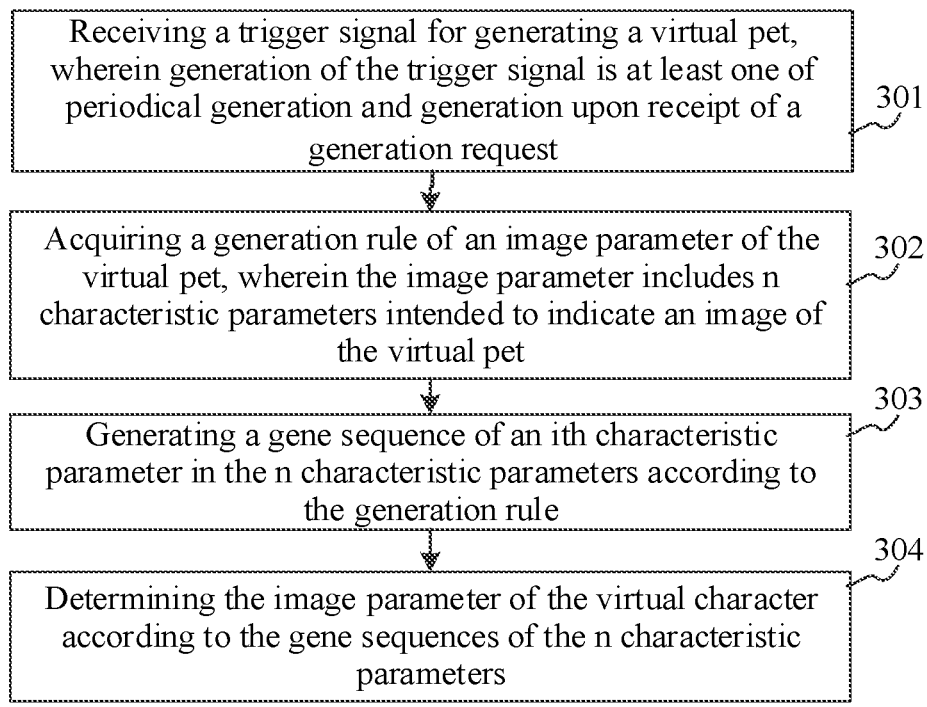
FIG. 3 is a flowchart of a method for generating an image parameter for a reproducible virtual character according to some embodiments.

FIG. 3 is a flowchart of a method for generating an image parameter for a reproducible virtual character according to some embodiments of the present disclosure. This embodiment is described using the case where the virtual character is a virtual pet, and the method is applied to the computer system as illustrated in FIG. 1 as an example. The method includes the following steps.

In step 301, a trigger signal for generating a virtual pet is received, wherein generation of the trigger signal is at least one of periodical generation and generation upon receipt of a generation request.

In step 302, a generation rule of an image parameter of the virtual pet is acquired, wherein the image parameter includes n characteristic parameters intended to indicate an image of the virtual pet.

n is a positive integer.

Figure 4:
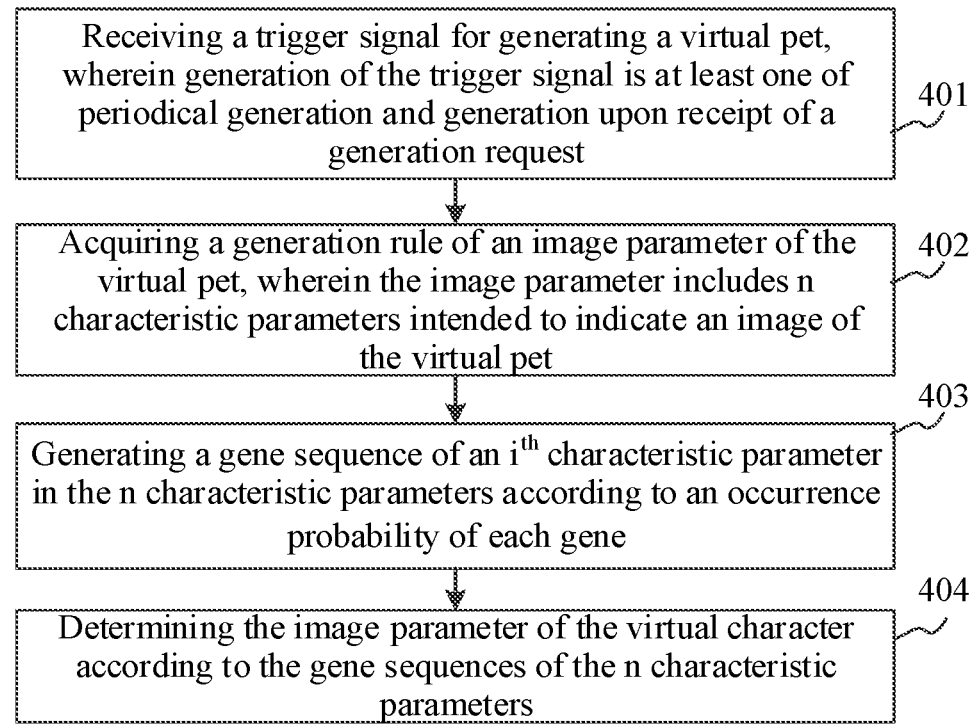
FIG. 4 is a flowchart of a method for generating an image parameter for a reproducible virtual character according to some embodiments.
Figure 5:
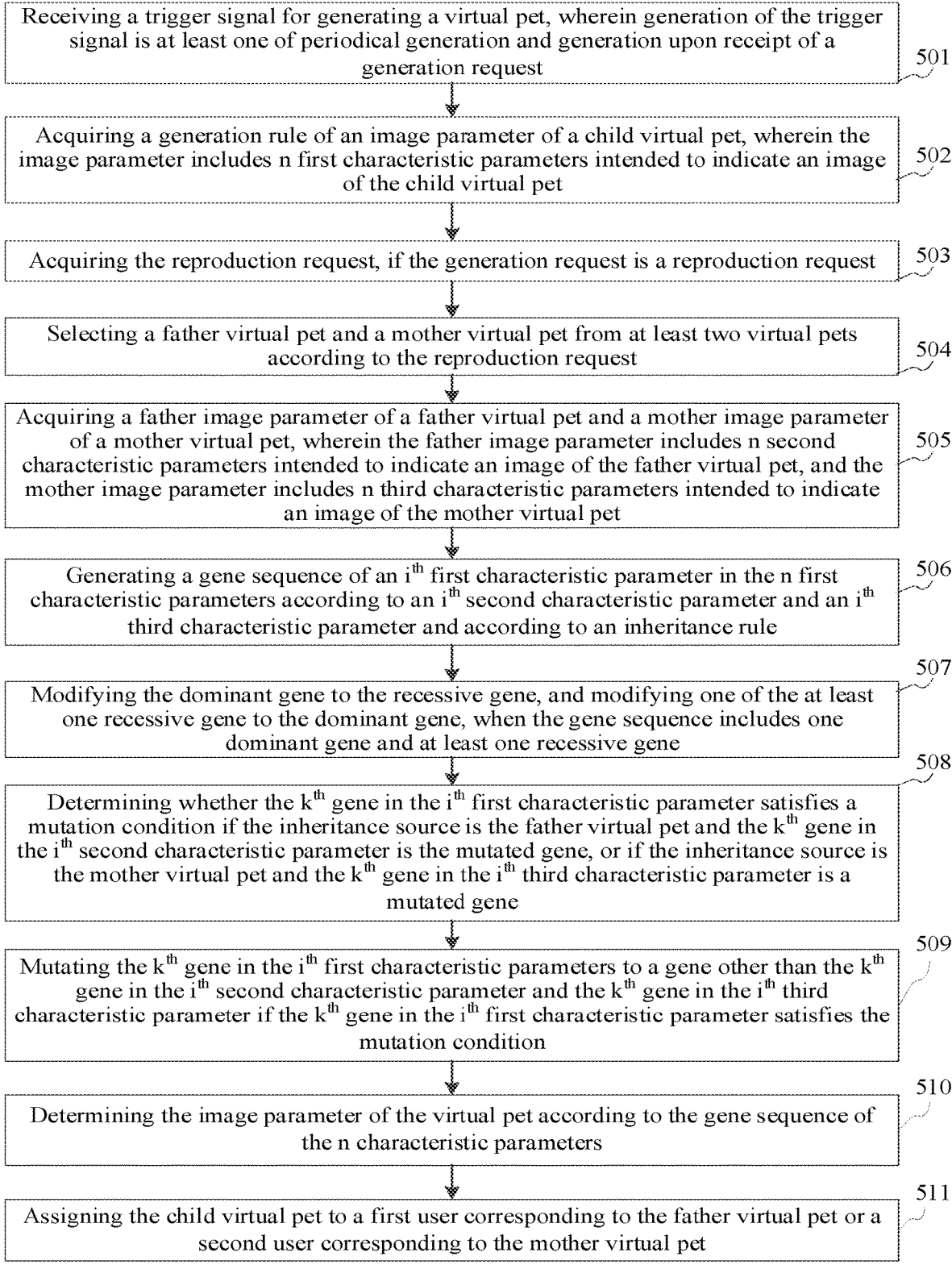
FIG. 5 is a flowchart of a method for generating an image parameter for a reproducible virtual character according to some embodiments.

With respect to a virtual pet with intergeneration being 0, a generation rule is randomly generating the virtual pet, which is detailed in the description in the embodiment as illustrated in FIG. 4. With respect to a virtual pet with intergeneration being greater than or equal to 1, a generation rule is generating the virtual pet according to father and mother virtual pets and according to a genetic inheritance rule, which is detailed in the description in the embodiment as illustrated in FIG. 5.

In step 303, a gene sequence of an $i^{th}$ characteristic parameter in the n characteristic parameters is generated according to the generation rule.

The gene sequence includes m genes, wherein $m \geq 2$, $i \leq n$.

In step 304, the image parameter of the virtual character is determined according to the gene sequences of the n characteristic parameters.

In summary, in the method for generating the image parameter for the reproducible virtual character according to the embodiment of the present disclosure, since an image of a virtual character is defined by an image parameter, and the image parameter includes n characteristic parameters, a gene sequence of an $i^{th}$ characteristic parameter in the n characteristic parameters may be firstly generated according to a generation rule, and then the image parameter of the virtual character may be determined according to the gene sequences of the n characteristic parameters. In this way, virtual characters having different images may be generated according to different gene sequences, that is, the images of the generated virtual characters are unanticipated, such that interest of generating the virtual characters is enhanced.

FIG. 4 is a flowchart of a method for generating an image parameter for a reproducible virtual character according to some embodiments of the present disclosure. This embodiment is described using the case where the virtual character is a virtual pet, the method is applied to the computer system as illustrated in FIG. 4, and intergeneration of the virtual pet is 0 as an example. The method includes the following steps:

In step 401, a trigger signal for generating a virtual pet is received, wherein generation of the trigger signal is at least one of periodical generation and generation upon receipt of a generation request.

The trigger signal is intended to trigger a server to generate a virtual pet, and the triggering mode of the server to generate the virtual pet may include at least one of the following:

First, the server is periodically triggered to generate a virtual pet.

In one possible implementation, a timer may be configured in the server. When the timer reaches a predetermined time length, a trigger signal is generated. In this case, the server receives the trigger signal, and is triggered under the trigger signal to generate a virtual pet. For example, the time length of the timer may be 15 minutes, and in this case the server receives a trigger signal at an interval of 15 minutes.

In one possible implementation, a clock may be configured in the server. When the clock reaches a predetermined time point, a trigger signal is generated. In this case, the server receives the trigger signal, and is triggered under the trigger signal to generate a virtual pet. For example, the predetermined time point may be 11: 00, and in this case, the server receives a trigger signal at 11: 00 each day.

Second, the server is triggered to generate a virtual pet upon receiving a generation request sent by a terminal. In some implementations, the terminal runs an application, wherein the application provides a function of displaying the virtual pet. In some implementations, a user may use the virtual pet in the application, for example, at least one of using the virtual pet to play games in a virtual environment, implementing simulation and emulation with the virtual pet, using the virtual pet to implement augmented reality (AR) games, and implementing AR educations with the virtual pet.

In one possible implementation, if the user takes lottery in the application, and acquires a virtual pet by lottery, the terminal sends a generation request to the server, and the server may generate a trigger signal upon receiving the generation request, or the server may use the generation request as a trigger signal, and be triggered by this trigger signal to generate a virtual pet.

In one possible implementation, if the user receives a gift in the application, and acquires a virtual pet by the gift, the terminal sends a generation request to the server, and the server may generate a trigger signal upon receiving the generation request, or the server may use the generation request as a trigger signal, and be triggered by this trigger signal to generate a virtual pet.

Third, the server is triggered periodically to generate a virtual pet upon receiving a generation request sent by a terminal.

In step 402, a generation rule of an image parameter of the virtual pet is acquired, wherein the image parameter includes n characteristic parameters intended to indicate an image of the virtual pet.

In this embodiment, if the intergeneration of a virtual pet to be generated is 0, the server determines that the generation rule of the image parameter of the virtual pet is randomly generating the virtual pet.

In step 403, a gene sequence of an $i^{th}$ characteristic parameter in the n characteristic parameters is generated according to an occurrence probability of each gene.

In this embodiment, the virtual pet includes n characteristic parameters, wherein each characteristic parameter includes a gene sequence, each gene sequence includes m genes, n being a positive integer, and m≥2.

In one possible implementation, the gene may be represented by a 5-bit binary number, and the gene=a decimal number converted from the binary number+1. In this case, the gene takes a value within the ranges of 1 to 9, and a to w. Table 1 lists a corresponding relationship between the gene and the 5-bit binary number. In Table 1, "C" stands for Code; "G" stands for Gene, "Bs" stands for Body Shape; "P" stands for Pattern, "E" stands for Eye; "M" stands for Mouth; "P" stands for Pendant; "Pc" stands for Pattern Color; "Bc" stands for Body Color; "Ec" stands for Eye Color; "Mg" stands for Mutation Gene; "Mp" stands for Mutation Probability;

TABLE 1

| C | G | Bs | P | E | M | Pe | Pc | Be | Ec | Mg | Mp |
|---|---|---|---|---|---|---|---|---|---|---|---|
| 0 | 1 | Hotot | None | Evil eye | Small tongue | None | Azure | Napoli yellow | Cornus Officinalis pink | h | 14% |
| 1 | 2 | Claw Rabbit | Polka dot | Justicial eye | Lovely lip | | Greenery | Pale blue | Napels yellow | | |
| 10 | 3 | | Magic cube | Cross eye | Moustache | | Psychedelic pink | Rouge pink | Bronze green | i | 14% |
| 11 | 4 | | Geometry | Sleepy eye | | | Bronze green | | Noctilucent green | | |
| 100 | 5 | | Star | Timid eye | Little tusk | | Light creamy yellow | Deep gray | | j | 14% |
| 101 | 6 | | Speckle | | Happy mouth | | | Light creamy yellow | Vermilion red | | |
| 110 | 7 | | | Wronged eye | | | | Asparagus green | Sunny orange | k | 14% |
| 111 | 8 | | | Serious eye | Round mouth | | | | Wisteria | | |
| 1000 | 9 | | | Teased eyebrow | | | | | | l | 14% |

TABLE 1-continued

| C | G | Bs | P | E | M | Pe | Pc | Be | Ec | Mg | Mp |
|---|---|---|---|---|---|---|---|---|---|---|---|
| 1001 | a | | | | | | | | | | |
| 1010 | b | | | | | | | | | m | 14% |
| 1011 | c | | | | | | | | | | |
| 1100 | d | | Flame | Phoenix eye | Big front tooth | | Ever green | | Psychedelic color | n | 14% |
| 1101 | e | Fluffy tail | Rainbow | Simple eye | Kiss | | | Lilac | Psychedelic pink | | |
| 1110 | f | | Center prating | Emei eye | Mouth curling | Psychedelic pink | | Pure white | | o | 14% |
| 1111 | g | | | | Surprised mouth | | | Sunny orange | Anisocoria | | |
| 10000 | h | | | | | | | | | p | 14% |
| 10001 | i | | | | | | | | | | |
| 10010 | j | | | | | | | | | q | 14% |
| 10011 | k | | | | | | | | | | |
| 10100 | l | | | | | | | | | r | 14% |
| 10101 | m | | | | | | | | | | |
| 10110 | n | | | | | | | | | s | 14% |
| 10111 | o | | | | | | | | | | |
| 11000 | p | | | | | | | | | t | 7% |
| 11001 | q | | | | | | | | | | |
| 11010 | r | | | | | | | | | u | 7% |
| 11011 | s | | | | | | | | | | |
| 11100 | t | | | | | | | | | v | 7% |
| 11101 | u | | | | | | | | | | |
| 11110 | v | | | | | | | | | | |
| 11111 | w | | | | | | | | | | |

In this embodiment, each gene sequence includes one dominate gene and m−1 recessive genes. Positions of the dominate gene and the recessive genes may be fixed in the gene sequence. For example, the first gene in the gene sequence is the dominate gene and the remaining genes are the recessive genes; or the last gene in the gene sequence is the dominate gene and the remaining genes are the recessive genes. In this embodiment, the positions of the dominate gene and the recessive genes in the gene sequence are not limited.

It should be noted that although each gene corresponds to an image material, only the image material corresponding to the dominate gene may be displayed. For example, if the dominate gene in the gene sequence of the body shape characteristic parameter is 1, the body shape of the displayed virtual pet is Hotot. Still for example, if the dominate gene in the gene sequence of the body shape characteristic parameter is 2, the body shape of the displayed virtual pet is Claw Rabbit. Still for example, if the dominate gene in the gene sequence of the eye color characteristic parameter is 1, the color of the eyes of the displayed virtual pet is *Cornus officinalis* pink.

Assuming that m is 4, and the image parameters of the virtual pet include in sequence the pattern color characteristic parameter, the body color characteristic parameter, the eye color characteristic parameter, the pendant characteristic parameter, the pattern characteristic parameter, the mouth characteristic parameter, the eye characteristic parameter, and the body shape characteristic parameter, then the image parameter of one virtual pet may be represented by the following table 2.

TABLE 2

| g | 9 | b | g | 1 | 1 | 1 | 1 | 3 | 6 | 5 | 7 | d | 8 | 9 | d | 2 | 7 | 2 | g | 8 | k | 7 | 9 | 9 | d | a | 9 | f | d | e | e |
|---|---|---|---|---|---|---|---|---|---|---|---|---|---|---|---|---|---|---|---|---|---|---|---|---|---|---|---|---|---|---|---|

As listed in Table 2, the gene sequence of the pattern color characteristic parameter is g9bg, the gene sequence of the body color characteristic parameter is 1111, the gene sequence of the eye color characteristic is 3657, the gene sequence of the pendant characteristic parameter is d89d, the gene sequence of the pattern characteristic parameter is 272g, the gene sequence of the mouth characteristic parameter is 8k70, the gene sequence of the eye characteristic parameter is 9da9, and the gene sequence of the body shape characteristic parameter is fdee.

Assuming that the last gene in a gene sequence is the dominant gene, and the remaining genes are all the recessive genes, then with reference to the image material corresponding to each gene in Table 1, it is apparent that for the displayed virtual pet, the body color is napels yellow, the eye color is sunny orange, the eyes are teased eyebrows and the body shape is fluffy tail rabbit.

After the image parameter, the characteristic parameter and the gene sequence are acknowledged, hereinafter the process of generating the image parameter for the virtual pet is described.

With respect to an $i^{th}$ characteristic parameter of n characteristic parameters, the server firstly determines genes with image materials in the $i^{th}$ characteristic parameter; and with respect to a $k^{th}$ gene in the gene sequence of the $i^{th}$ characteristic parameter, a gene is randomly selected from these genes as the $k^{th}$ gene. i takes a value of 1 to n, and k takes a value of 1 to m.

For example, if the $i^{th}$ characteristic parameter is the eye characteristic parameter and m is 4, and as listed in Table 1, the genes of the image materials corresponding to the eyes are 1-9 and d-f, the server randomly selects four genes from 1-9 and d-f, and respectively uses the four genes as four genes in the gene sequence of the eye characteristic parameter to obtain the gene sequence of the eye characteristic parameter. For example, if the four genes that are randomly selected by the server are respectively 2, 7, e, and 9, the gene sequence of the eye characteristic parameter is 27e9.

In some implementations, the probability that each gene is randomly selected may be the same. That is, the occurrence probability of each gene is the same. Alternatively, the probabilities that some genes are randomly selected may be different. That is, the occurrence probability of each gene is different. The sever may predefine a probability threshold. In this case, the image material corresponding to the gene with the probability of being selected being less than the probability threshold is a rare material, for example, as in Table 1, the image materials corresponding to the genes d-g are all rare materials; and the image material corresponding to the gene with the probability of being selected being greater than or equal to the probability threshold is a common material, for example, as in Table 1, the image materials corresponding to the genes 1-9 are all common materials. In other words, the gene with the probability of being selected being less than the probability threshold is a rare gene, and the gene with the probability of being selected being greater than or equal to the probability threshold is a common gene.

In some implementations, if a virtual pet has rare genes, the server may also define the attribute of the virtual pet according to the number of the rare genes as the dominant genes. For ease of description, hereinafter the case where the virtual pet has the rare gene and the rare gene is the dominant gene is defined as that the virtual pet has a rare trait.

In one possible implementation, the server may define common attributes for a virtual pet having no rare trait, and define a rare attribute for a virtual pet having 1 to 2 rare traits, define a rarely seen attribute for a virtual pet having 3 to 4 rare traits, define an epic attribute for a virtual pet having 5 to 6 rare traits, and define a legend attribute for a virtual pet having over 6 rare traits. Nevertheless, this embodiment is described by using the above attributes and the number of rare traits corresponding to each attribute as an example. The server may also define other attributes, and may also define another number of rare traits corresponding to each attribute, which are not limited in this embodiment.

In some implementations, the server may also calculate a birth probability of the virtual pet according to the occurrence probabilities of the rare genes and the common genes. For example, with respect to each characteristic parameter, the sever may firstly calculate the probability that the characteristic parameter has the rare trait according to the occurrence probability of the rare gene in the characteristic parameter. If the rare attribute corresponding to one rare trait, the server sums the probability of each characteristic parameter have the rare trait in the n characteristic parameters to obtain the birth probability of the virtual pet having the rare attribute. Assuming that the probabilities that four characteristic parameters have the rare trait are respectively 10%, 15%, 20%, and 20%, then the birth probability of the virtual pet having the rare attribute is 10%+15%+20%+20%=55%. If the rare attribute corresponding to two rare traits, the server multiplies the probabilities that each two characteristic parameters have the rare traits in the n characteristic parameters, and sums the multiplication results to obtain the birth probability of the virtual pet having the rare attribute. Assuming that the probabilities that four characteristic parameters have the rare trait are respectively 10%, 15%, 20%, and 20%, then the birth probability of the virtual pet having the rare attribute is $10\%*15\%+10\%*20\%+10\%*20\%+15\%*20\%+15\%*20\%+20\%*20\%=15.5\%$.

In step 404, the image parameter of the virtual character is determined according to the gene sequences of the n characteristic parameters.

In some implementations, the server may prohibit transactions of the virtual pet with generation 0. Alternatively, the server may also allow transactions of the virtual pet of generation 0. In this case, the server may also calculate the price of the virtual pet of generation 0, or the server may also put the virtual pet of generation 0 at auction.

When the server is pricing of the virtual pet of generation 0, in one possible implementation, the server may predefine the price of a virtual pet with a common attribute, then calculate the birth probabilities of the virtual pets with all the attribute hierarchies, and finally calculate the price of the virtual pets with the attribute of each hierarchy by using the formula: price of virtual pet with attribute of current hierarchy=(birth probability of virtual pet with attribute of previous hierarchy/birth probability of virtual pet with attribute of current hierarchy)*price of virtual pet with attribute of previous hierarchy). For example, the price of a virtual pet with a common attribute is 500 Yuan, and the birth probabilities of the virtual pets with the attributes of all the hierarchies are respectively 60%, 30%, 8%, 1.5%, and 0.5%, according to the formula, then the prices of these virtual pets are respectively calculated as 100 Yuan, 3750 Yuan, 20000 Yuan, and 60000 Yuan.

In some implementations, the server may also define an increment amplitude coefficient between the prices of the attributes of all the hierarchies, such that price differences may be flexibly adjusted between the virtual pets of all the hierarchies. For example, if the increment amplitude coefficient is 1.2, the prices of the virtual pets with the attributes of all the hierarchies, 1200 Yuan, 5400 Yuan, 34560 Yuan, and 124416 Yuan.

In summary, in the method for generating the image parameter for the reproducible virtual character according to the embodiment of the present disclosure, since an image of a virtual character is defined by an image parameter, and the image parameter includes n characteristic parameters, a gene sequence of an $i^{th}$ characteristic parameter in the n characteristic parameters may be firstly generated according to occurrence probabilities of various genes, and then the image parameter of the virtual character may be determined according to the gene sequences of the n characteristic parameters. In this way, virtual characters having different images may be generated according to different gene sequences, that is, the images of the generated virtual characters are unanticipated, such that interest of generating the virtual characters is enhanced.

FIG. 5 is a flowchart of a method for generating an image parameter for a reproducible virtual character according to some embodiments of the present disclosure. This embodiment is described using the case where the virtual character is a virtual pet, the method is applied to the computer system as illustrated in FIG. 1, and intergeneration of the virtual pet is greater than or equal to 1 as an example. The method includes the following steps:

In step 501, a trigger signal for generating a virtual pet is received, wherein generation of the trigger signal is at least one of periodical generation and generation upon receipt of a generation request.

For details of receiving the trigger signal by the server, reference may be made to step 401, which are not described herein any further.

In step 502, a generation rule of an image parameter of a child virtual pet is acquired, wherein the image parameter includes n first characteristic parameters intended to indicate an image of the child virtual pet.

In this embodiment, if intergeneration of a child virtual pet to be generated is greater than or equal to 1, the server determines that the generation rule of the image parameter of the child virtual pet is generating the child virtual pet according to father and mother virtual pets and according to a genetic inheritance rule.

In step 503, if the generation request is a reproduction request, the reproduction request is acquired.

The reproduction request is intended to request to reproduce the child virtual pet according to the father virtual pet and the mother virtual pet. The reproduction request may be sent by the terminal or generated by the server, which is not limited in this embodiment.

In some implementations, the terminal may send the reproduction request to the server in any of the following ways:

First, a user sends a reproduction request to the server by an application in the terminal. If the reproduction request carries an pet identifier of one virtual pet, the user requests to reproduce a virtual pet by a virtual pet adopted by the user and a virtual pet indicated in another reproduction request randomly selected by the server; or if the reproduction request carries pet identifiers of two virtual pets, the user requests to reproduce a virtual pet by the virtual pet adopted by the user and another virtual pet selected by the user.

Second, if the user takes lottery in an application, and acquires a virtual pet by the lottery, the terminal sends a reproduction request to the server to request the server to randomly select a father virtual pet and a mother virtual pet according to the reproduction request to reproduce a virtual pet, and if the reproduction request carries an pet identifier of a virtual pet to be adopted by the user, the selected father virtual pet and mother virtual pet may be owned by the user, or if the reproduction request does not carry an pet identifier of a virtual pet, the selected father virtual pet and mother virtual pet may be previously generated and stored on the server.

Third, if the user receives a gift in an application, and acquires a virtual pet by the gift, the terminal sends a reproduction request to the server. In this case, the reproduction request may not carry an pet identifier of a virtual pet, and is intended to request the server to randomly select a father virtual pet and a mother virtual pet according to the reproduction request to reproduce a virtual pet.

In step 504, a father virtual pet and a mother virtual pet are selected from at least two virtual pets according to the reproduction request.

In some implementations, if a reproduction request carries pet identifiers of two virtual pets, the server determine the virtual pets indicated by these two pet identifiers as the father virtual pet and the mother virtual pet respectively.

In some implementations, if a reproduction request carries an pet identifier of one virtual pet, the server may place each two of all the received reproduction requests into groups, and the virtual pets indicated by two pet identifiers carried in each group of reproduction requests are determined as the father virtual pet and the mother virtual pet. Alternatively, the server may randomly select a portion of reproduction requests from all the received reproduction request, place each two of the portion of reproduction requests into groups, and the virtual pets indicated by two identifiers carried in each group of reproduction requests are determined as the father virtual pet and the mother virtual pet.

In some implementations, if the genders of the virtual pets are not defined, the server may randomly determine one of the two virtual pets as the father virtual pet and determine the other as the mother virtual pet. If the genders of the virtual pets are defined, the server may determine the virtual pet which is defined as male as the father virtual pet, and determine the virtual pet which is defined as female as the mother virtual pet.

It should be noted that if the genders of the virtual pets are clearly defined, when the server places the reproduction requests into groups, the server needs to determine that each group of reproduction requests indicates a female virtual pet and a male virtual pet.

In step 505, a father image parameter of a father virtual pet and a mother image parameter of a mother virtual pet are acquired, wherein the father image parameter includes n second characteristic parameters intended to indicate an image of the father virtual pet, and the mother image parameter includes n third characteristic parameters intended to indicate an image of the mother virtual pet.

The father image parameter and the mother image parameter are the same as the image parameters in step 403 in terms of form, which may be referenced to the description in step 403 and are not described herein any further.

In some implementations, if the reproduction request is sent by the user to the server after selecting the father virtual pet and the mother virtual pet, the father image parameter and the mother image parameter may be carried in the reproduction request that is sent by the terminal to the server; if the father virtual pet and the mother virtual pet in the reproduction request are randomly selected by the server from the generated virtual pets that are stored, the father image parameter and the mother image parameter may be corresponding stored in the server. In addition, the father image parameter and the mother image parameter are stored corresponding to the identifiers of the father virtual pet and the mother virtual pet in the server, and acquired by the inquiry to the identifiers after the sever acquires the identifier of the father virtual pet and the identifier of the mother virtual pet.

In step 506, a gene sequence of an $i^{th}$ first characteristic parameter in the n first characteristic parameters is generated according to an $i^{th}$ second characteristic parameter and an $i^{th}$ third characteristic parameter and according to an inheritance rule.

In this embodiment, the $i^{th}$ first characteristic parameter is generated according to the $i^{th}$ second characteristic parameter and the $i^{th}$ third characteristic parameter.

The gene sequence of the $i^{th}$ first characteristic parameter is generated according to the $i^{th}$ second characteristic parameter and the $i^{th}$ third characteristic parameter and according to the inheritance rule includes:

An inheritance source of a $k^{th}$ gene in the $i^{th}$ first characteristic parameter is determined according to the inheritance rule, k being a positive integer;

A $k^{th}$ gene in an $i^{th}$ second characteristic parameter is determined as the $k^{th}$ gene in the $i^{th}$ first characteristic parameter if the inheritance source is the father virtual pet; and A $k^{th}$ gene in an $i^{th}$ third characteristic parameter is determined as the $k^{th}$ gene in the $i^{th}$ first characteristic parameter if the inheritance source is the mother virtual pet.

The inheritance rule is intended to define an inheritance source of each gene. In one possible implementation, the inheritance source of the specific $k^{th}$ gene in the inheritance rule is fixed. For example, the inheritance source of the specific $k^{th}$ gene in the inheritance rule is the father virtual pet. In another possible implementation, the inheritance source of the specific $k^{th}$ gene in the inheritance rule is obtained by calculation according to the predetermined algorithm. For example, if the predetermined algorithm is a random algorithm, at the last time, it is determined, according to the random algorithm, that the inheritance source of the specific $k^{th}$ gene in the inheritance rule is the father virtual pet; and at this time, it is determined, according to the random algorithm, that the inheritance source of the specific $k^{th}$ gene in the inheritance rule is the mother virtual pet.

For example, an $i^{th}$ characteristic parameter is an eye characteristic parameter, and the gene sequence of the eye characteristic parameter of the father virtual pet is 8da9, and the gene sequence of the eye characteristic parameter of the mother virtual pet is 3657; if the inheritance source of the gene sequence specified by the inheritance rule is respectively the father virtual pet, the mother virtual pet, the father virtual pet, and the mother virtual pet, the gene sequence of the eye characteristic parameter of the child virtual pet is 86a7.

The gene sequence of each characteristic parameter in n characteristic parameters of the child virtual pet may be calculated according to the algorithm as described above, and a child image parameter of the child virtual pet may also be obtained. In this case, step 510 may be directly performed.

In some implementations, to enhance interest of the process of generating the child virtual pet, the server may modify child image parameter by at least one of an exchange rule and a mutation rule. The exchange rule refers to exchanging one dominant gene with one recessive gene in the gene sequence. The mutation rule refers to modifying at least one gene in at least one gene sequence of the child virtual pet to a gene other than the corresponding genes of the father virtual pet and the mother virtual pet.

When the server modifies the child image parameter according to the exchange rule, step 507 is performed after step 506, and steps 510 to 511 are performed after step 507.

When the server modifies the child image parameter according to the mutation rule, steps 508 to 511 are performed after step 506.

When the server modifies the child image parameter according to the exchange rule and the mutation rule, steps 507 to 511 are performed after step 506, and reference may be made to FIG. 5.

In step 507, when the gene sequence includes one dominant gene and at least one recessive gene, the dominant gene is modified to the recessive gene, and one of the at least one recessive gene is modified to the dominant gene.

The server may randomly select one recessive gene from the at least one recessive gene. In some implementations, when the recessive gene is the same as the dominant gene, two gene sequences before and after the modification are the same. Therefore, the server may further compare the selected recessive gene with the dominant gene, and when the selected recessive gene is the same as the dominant gene, the server may select one recessive gene again until the selected recessive gene is different from the dominant gene.

In some implementations, the server may define a probability that the dominant gene is modified to the recessive gene, and then determine whether the dominant gene in the gene sequence needs to be modified to the recessive gene according to the probability.

For ease of understanding, modification to the gene sequence is described as an example. Assuming that the gene sequence of the eye characteristic parameter is 8da9, if the dominant gene is 9, and one selected recessive gene is d, then the modified gene sequence is 89ad.

In step 508, if the inheritance source is the father virtual pet and the $k^{th}$ gene in the $i^{th}$ second characteristic parameter is the mutated gene, or if the inheritance source is the mother virtual pet and the $k^{th}$ gene in the $i^{th}$ third characteristic parameter is a mutated gene, whether the $k^{th}$ gene in the $i^{th}$ first characteristic parameter satisfies a mutation condition is determined.

As described in step 506, in normal conditions, the $k^{th}$ gene in the $i^{th}$ first characteristic parameter is the $k^{th}$ gene in the $i^{th}$ second characteristic parameter, or the $k^{th}$ gene in the $i^{th}$ third characteristic parameter. When the $k^{th}$ gene is modified to a gene other than these two genes, the $k^{th}$ gene is called a mutated gene.

In some implementations, the server may define the probability of gene mutation, and determine whether the $k^{th}$ gene in the $i^{th}$ first characteristic parameter satisfies the mutation condition according to the probability.

In step 509, the $k^{th}$ gene in the $i^{th}$ first characteristic parameter mutates to a gene other than the $k^{th}$ gene in the $i^{th}$ second characteristic parameter and the $k^{th}$ gene in the $i^{th}$ third characteristic parameter if the $k^{th}$ gene in the $i^{th}$ first characteristic parameter satisfies the mutation condition.

In some implementations, the server may place the genes into at least two layers, and the algorithm of gene layering may be not limited in this embodiment. In one possible implementation, a minimum value of the genes in an upper layer after the layering is greater than a maximum value of the genes in a lower layer. Referring to Table 1, the server defines genes 1-g as a first layer, defines genes h-p as a second layer, defines genes q-t as a third layer, defines genes u-v as a fourth layer, and defines gene w as a fifth layer.

In some implementations, a gene in a lower layer may mutate to any one gene in upper layer, that is, if the mutated gene is a gene in a $j^{th}$ layer, the $k^{th}$ gene in the $i^{th}$ first characteristic parameter mutates to a gene other than the $k^{th}$ gene in the $i^{th}$ second characteristic parameter and the $k^{th}$ gene in the $i^{th}$ third characteristic parameter, includes: the $k^{th}$ gene in the $i^{th}$ first characteristic parameter mutates to a gene in a $(j+1)^{th}$ layer, and a minimum value of the gene in the $(j+1)^{th}$ layer is greater than a maximum value of a gene in the $j^{th}$ layer, j being a positive integer.

In some implementations, a gene in a lower layer may mutate to a specific gene in the genes in upper layers. As described in Table 1, gene 1 and gene 2 may mutate to gene h, and the mutation probability is 14%; gene 3 and gene 4 may mutate to gene i, and the mutation probability is 14%; and gene p and gene q may mutate to gene t, and the mutation probability is 7%.

In some implementations, a gene in a lower layer may mutate to any one gene in the upper layers, which is not limited in the embodiment.

In step 510, the image parameter of the virtual pet is determined according to the gene sequence of the n characteristic parameters.

In step 511, the child virtual pet is assigned to a first user corresponding to the father virtual pet or a second user corresponding to the mother virtual pet.

In some implementations, the server may allow transactions of the child virtual pet. For example, the user may put the child virtual pet on auction.

In summary, according to the method for generating the image parameter for the reproducible virtual character in the embodiment, a child virtual character is generated by a father virtual character and a mother virtual character, and the child image parameter of the child virtual character is determined according to a father image parameter and a mother image parameter, such that the manner of generating the virtual character is increased, and interest of the process of generating the virtual characters is enhanced.

The first characteristic parameter is determined according to at least one of the inheritance rule, the exchange rule, and mutation rule, but the child virtual character is not reproduced from the father virtual character and the mother virtual character singly only by duplication. In the reproduction process, the real biological genetic inheritance rule is introduced, and the reproduction process more complies with the inheritance rule, such that interest of the process of generating the virtual characters is enhanced.

Figure 6:
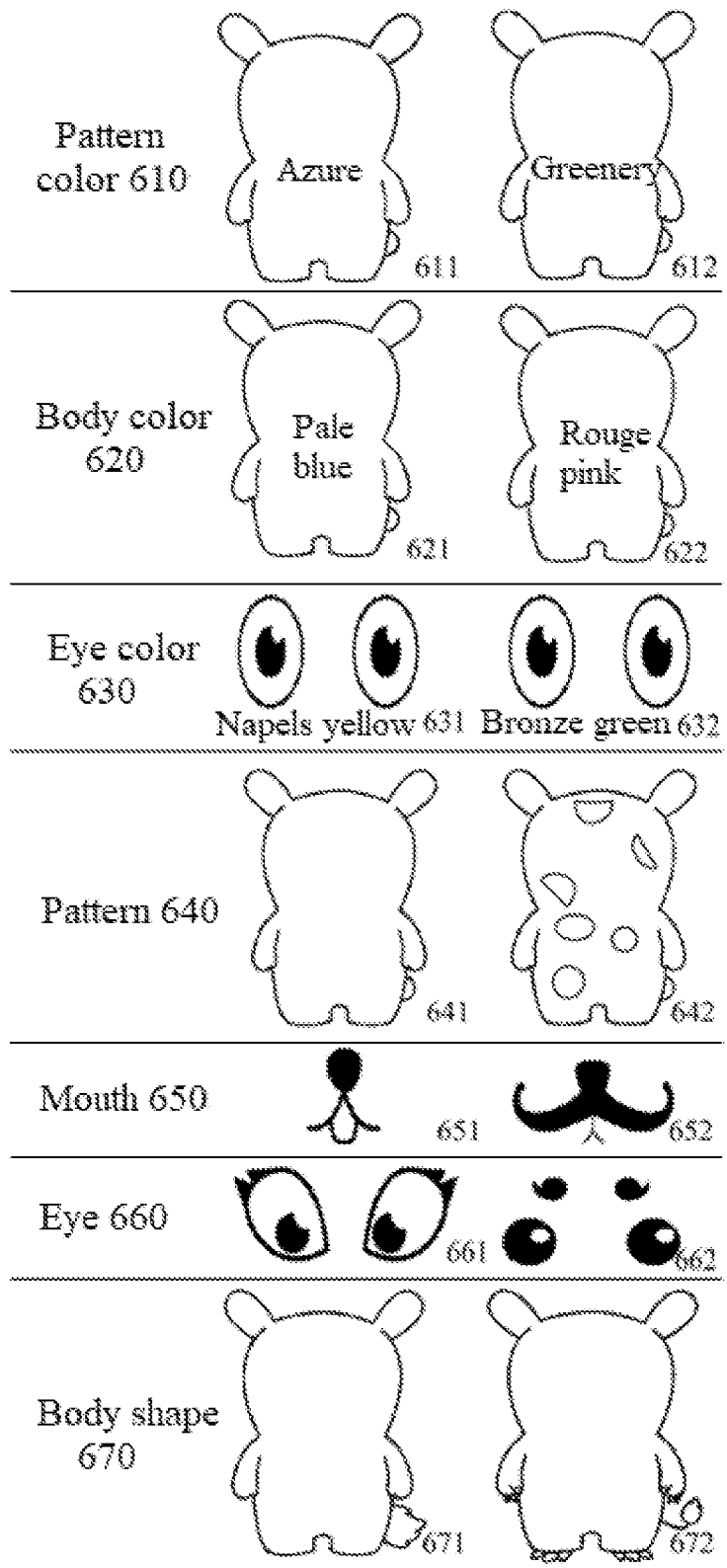
FIG. 6 is a schematic diagram of characteristics of a virtual character according to some embodiments.

FIG. 6 is a schematic diagram of characteristics of a virtual character according to some embodiments of the present disclosure. Taking a child image parameter including seven characteristics as an example for description. The seven characteristics include pattern color 610, body color 620, eye color 630, pattern 640, mouth 650, eye 660, and body shape 670. The pattern refers to grains formed by lines. Each material in the same category of parameters has a different color and/or shape. In some implementations, each material has a transparency n, wherein the transparency is greater than 0% and less than 80%. That is, each material has a semi-transparency, and grain patterns of different layers may be observed after the parameters of different layers are superimposed.

FIG. 6 illustrates two pattern colors, respectively, azure pattern and greenery pattern. The pattern colors may be distinguished based on different colors and may have the same shape. Correspondingly, FIG. 6 further illustrates two body color materials, two eye color materials, two pattern materials, two mouth materials, two eye materials, and two body shape materials.

In some implementations, two patterns 640, mouths 650, eyes 660, and body shapes 670 in FIG. 2 are categorized according to the shapes. However, the parameters of the same shape may also be divided into more parameters according to colors, which are not limited in the present disclosure.

After a terminal acquires an image parameter of a pet rabbit, if the seven characteristic parameters respectively correspond to pattern color 610, body color 620, eye color 630, pattern 640, mouth 650, eye 660, and body shape 670, an azure pattern color material 611 is extracted from a pattern material set according to a first characteristic parameter; a pale blue body color material 621 is extracted from a body color material set according to a second characteristic parameter; a bronze green eye color material 632 is extracted from an eye color material set according to a third characteristic parameter; a center parting pattern material 641 is extracted from a pattern material set according to a fourth characteristic parameter; a moustache mouth material 652 is extracted from a mouth material set according to a fifth characteristic parameter; a justicial eye material 661 is extracted from an eye material set according to a sixth characteristic parameter; a fluffy tail body shape material 671 is extracted from a body shape material set according to a seventh characteristic parameter.

Figure 7:
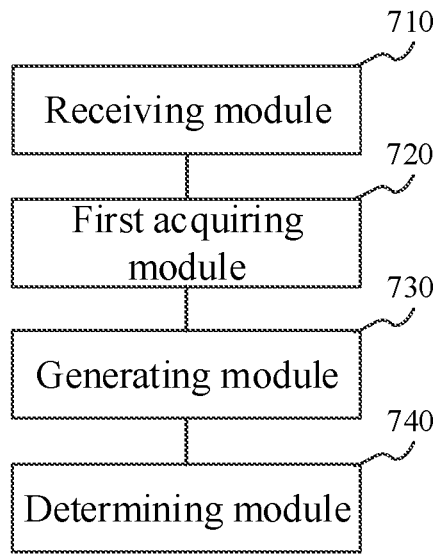
FIG. 7 is a block diagram of an apparatus for generating an image parameter for a reproducible virtual character according to some embodiments.

FIG. 7 is a block diagram of an apparatus for generating an image parameter for a reproducible virtual character according to some embodiments of the present disclosure. The apparatus may be applied to the computer system as illustrated in FIG. 1. As illustrated in FIG. 7, the apparatus includes a receiving module 710, a first acquiring module 720, a generating module 730, and a determining module 740.

The receiving module 710 is configured to receive a trigger signal for generating a virtual character, wherein generation of the trigger signal is at least one of periodical generation and generation upon receipt of a generation request.

The first acquiring module 720 is configured to acquire a generation rule of an image parameter of the virtual character, wherein the image parameter includes n characteristic parameters intended to indicate an image of the virtual character, n being an integer.

The generating module 730 is configured to generate a gene sequence of an $i^{th}$ characteristic parameter in the n characteristic parameters according to the generation rule obtained by the first acquiring module 720, wherein the gene sequence includes m genes, $m \geq 2$, $I \leq n$.

The determining module 740 is configured to determine the image parameter of the virtual character according to the gene sequences of the n characteristic parameters generated by the generating module 730.

In summary, the apparatus for generating the image parameter for the reproducible virtual character is provided by the present disclosure, since an image of a virtual character is defined by an image parameter, and the image parameter includes n characteristic parameters, a gene sequence of an $i^{th}$ characteristic parameter in the n characteristic parameters may be firstly generated according to a generation rule, and then the image parameter of the virtual character may be determined according to the gene sequences of the n characteristic parameters. In this way, virtual characters having different images may be generated according to different gene sequences, that is, the images of the generated virtual characters are unanticipated, such that interest of the process of generating the virtual characters is enhanced.

Figure 8:
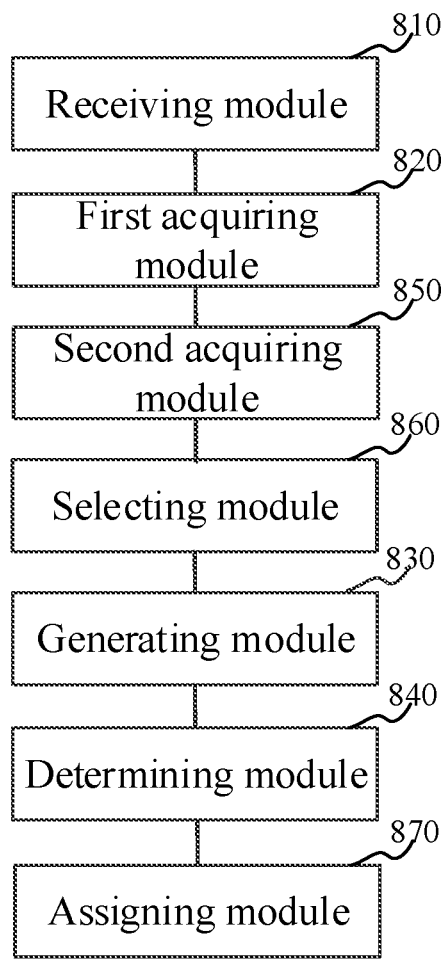
FIG. 8 is a block diagram of an apparatus for generating an image parameter for a reproducible virtual character according to some embodiments.

FIG. 8 is a block diagram of an apparatus for generating an image parameter for a reproducible virtual character according to some embodiments of the present disclosure. The apparatus may be applied to the computer system as illustrated in FIG. 1. As illustrated in FIG. 8, the apparatus includes a receiving module 810, a first acquiring module 820, a generating module 830, and a determining module 840.

The receiving module 810 is configured to receive a trigger signal for generating a virtual character, wherein generation of the trigger signal is at least one of periodical generation and generation upon receipt of a generation request.

The first acquiring module 820 is configured to acquire a generation rule of an image parameter of the virtual character, wherein the image parameter includes n characteristic parameters intended to indicate an image of the virtual character, n being an integer.

The generating module 830 is configured to generate a gene sequence of an $i^{th}$ characteristic parameter in the n characteristic parameters according to the generation rule obtained by the first acquiring module 820, wherein the gene sequence includes m genes, $m \geq 2$, $i \leq n$.

The determining module 840 is configured to determine the image parameter of the virtual character according to the gene sequences of the n characteristic parameters generated by the generating module 830.

In one possible implementation, if intergeneration of the virtual character is 0, the generating module 830 is further configured to: generate the gene sequence of the $i^{th}$ characteristic parameter in the n characteristic parameters according to an occurrence probability of each gene.

In one possible implementation, if intergeneration of the virtual character is greater than or equal to 1, the virtual character is a child virtual character, the image parameter is a child image parameter, the characteristic parameter is a first characteristic parameter, and the generating module 830 is further configured to: acquire a father image parameter of a father virtual character and a mother image parameter of a mother virtual character, the father image parameter including n second characteristic parameters intended to indicate an image of the father virtual character, the mother image parameter including n third characteristic parameters intended to indicate an image of the mother virtual character; and generate a gene sequence of an $i^{th}$ first characteristic parameter in the n first characteristic parameters according to an $i^{th}$ second characteristic parameter and an $i^{th}$ third characteristic parameter and according to an inheritance rule.

In one possible implementation, the generating module 830 is further configured to: determine an inheritance source of a $k^{th}$ gene in the $i^{th}$ first characteristic parameter according to the inheritance rule, k being a positive integer; determine a $k^{th}$ gene in an $i^{th}$ second characteristic parameter as the $k^{th}$ gene in the $i^{th}$ first characteristic parameter if the inheritance source is the father virtual character; and determine a $k^{th}$ gene in an $i^{th}$ third characteristic parameter as the $k^{th}$ gene in the $i^{th}$ first characteristic parameter if the inheritance source is the mother virtual character.

In one possible implementation, if the gene sequence includes one dominant gene and at least one recessive gene, the generating module 830 is further configured to: upon obtaining the gene sequence, modify the dominant gene to a recessive gene, and modifying one of the at least one recessive gene to a dominant gene.

In one possible implementation, the generating module 830 is further configured to: determine the $k^{th}$ gene in the $i^{th}$ first characteristic parameter satisfies a mutation condition if the inheritance source is the father virtual character and the $k^{th}$ gene in the $i^{th}$ second characteristic parameter is a mutated gene, or if the inheritance source is the mother virtual character and the $k^{th}$ gene in the $i^{th}$ third characteristic parameter is a mutated gene; and mutate the $k^{th}$ gene in the $i^{th}$ first characteristic parameter to a gene other than the $k^{th}$ gene in the $i^{th}$ second characteristic parameter and the $k^{th}$ gene in the $i^{th}$ third characteristic parameter if the $k^{th}$ gene in the $i^{th}$ first characteristic parameter satisfies the mutation condition.

In one possible implementation, if the mutated gene is a gene in a $j^{th}$ layer, the generating module 830 is further configured to: mutate the $k^{th}$ gene in the $i^{th}$ first characteristic parameter to a gene in a $(j+1)^{th}$ layer, a minimum value of the gene in the $(j+1)^{th}$ layer being greater than a maximum value of a gene in the $j^{th}$ layer, j being a positive integer.

In one possible implementation, the apparatus further includes a second acquiring module 850 and a selecting module 860.

The second acquiring module 850 is configured to acquire a reproduction request.

The selecting module 860 is configured to select the father virtual character and the mother virtual character from at least two virtual characters according to the reproduction request.

In one possible implementation, the apparatus further includes an assigning module 870.

The assigning module 870 is configured to assign the child virtual character to a first user corresponding to the father virtual character or a second user corresponding to the mother virtual character.

In one possible implementation, the image of the virtual character includes n different types of image materials, wherein each type of image materials is determined by a dominant gene in a gene sequence, the gene sequence including one dominant gene and at least one recessive gene.

In summary, in the apparatus for generating the image parameter for the reproducible virtual character according to the embodiment of the present disclosure, since an image of a virtual character is defined by an image parameter, and the image parameter includes n characteristic parameters, a gene sequence of an $i^{th}$ characteristic parameter in the n characteristic parameters may be firstly generated according to a generation rule, and then the image parameter of the virtual character may be determined according to the gene sequences of the n characteristic parameters. In this way, virtual characters having different images may be generated according to different gene sequences, that is, the images of the generated virtual characters are unanticipated, such that interest of the process of generating the virtual characters is enhanced.

The first characteristic parameter is determined according to at least one of the inheritance rule, the exchange rule, and mutation rule, but the child virtual character is not reproduced from the father virtual character and the mother virtual character singly only by duplication. In the reproduction process, the real biological genetic inheritance rule is introduced, and the reproduction process more complies with the inheritance rule, such that interest of the process of generating the virtual characters is enhanced.

With respect to the apparatus in the above embodiment, details about performing corresponding operations by each module have been described in the method embodiment, which are not given herein any further.

Some embodiments of the present disclosure further provide an apparatus for generating an image parameter for a reproducible virtual character, which may perform the method for generating the image parameter for the reproducible virtual character. The apparatus includes a processor, and a memory for storing instructions executable by the processor.

The processor is configured to:

receive a trigger signal for generating a virtual character, generation of the trigger signal being at least one of periodical generation and generation upon receipt of a generation request;

acquire a generation rule of an image parameter of the virtual character, the image parameter including n characteristic parameters intended to indicate an image of the virtual character, n being an integer;

generate a gene sequence of an $i^{th}$ characteristic parameter in the n characteristic parameters according to the generation rule, the gene sequence including m genes, m≥2, i≤n; and determine the image parameter of the virtual character according to the gene sequences of the n characteristic parameters.

Figure 9:
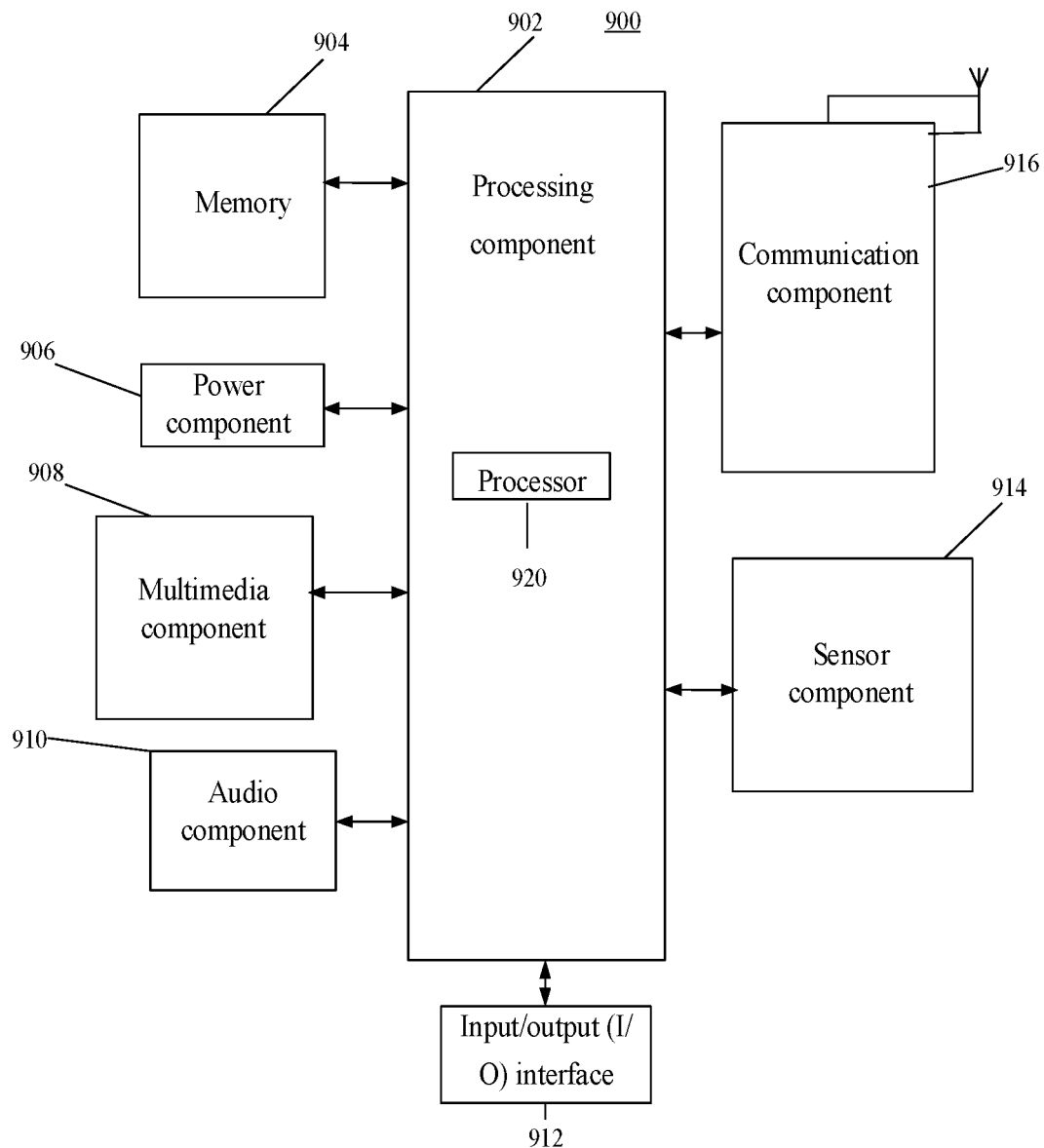
FIG. 9 is a block diagram of an apparatus for use in generating an image parameter for a reproducible virtual character according to some embodiments.

FIG. 9 is a block diagram of an apparatus 900 for use in generating an image parameter for a reproducible virtual character according to some embodiments. For example, the apparatus 900 may be a mobile phone, a computer, a digital broadcasting terminal, a message transceiver device, a gaming console, a tablet device, medical equipment, fitness equipment, a personal digital assistant, or the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include at least one processor 920 to execute instructions for performing all or a part of the steps in the above method. In addition, the processing component 902 may include one or more modules which facilitate the interaction between the processing component 902 and other components. For example, the processing component 902 may include a multimedia module to facilitate the interaction between the multimedia component 908 and the processing component 902.

The memory 904 is operable to store various types of data to support the operations of the apparatus 900. Examples of such data include instructions for any application or method operated on the apparatus 900, contact data, phonebook data, messages, pictures, videos and the like. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 906 provides power to various components of the apparatus 900. The power component 906 may include a power management system, one or more power supplies, and other components associated with the generation, management, and distribution of power in the apparatus 900.

The multimedia component 908 includes a screen providing an output interface between the apparatus 900 and a user. In some embodiments, the screen may include a liquid crystal display (LCD) and a touch panel (TP). In some embodiments, the screen may include an organic light-emitting diode (OLED) display or other types of displays.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive external multimedia data when the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, or a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and a peripheral interface module, such as a keyboard, a click wheel, a button, or the like. The buttons may include, but not limited to, a home button, a volume button, a starting button, and a locking button.

The sensor component 914 includes one or more sensors to provide status assessments of various aspects of the apparatus 900. For example, the sensor component 914 may detect an open/closed status of the apparatus 900, relative positioning of components, e.g., the display and the keypad, of the apparatus 900, a change in position of the apparatus 914 or a component of the apparatus 900, a presence or absence of user in contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate wired or wireless communications between the apparatus 900 and other devices. The apparatus 900 may access a wireless network based on a communication standard, such as Wi-Fi, 2G or 3G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

Some embodiments further provide a non-transitory computer-readable storage medium storing instructions, for example, the memory 904 including instructions. The instructions can be executed by the processor 920 of the apparatus 900 to perform the above methods. For example, the non-transitory computer-readable storage medium may be a read-only memory (ROM), a random access memory (RAM), a compact disc ROM (CD-ROM), a magnetic tape, a floppy disk, an optical data storage device or the like.

A non-transitory computer-readable storage medium, when the instructions in the storage medium being executed by a processor of a mobile terminal, may cause the mobile terminal to perform the method for generating the image parameter for a reproducible virtual character.

Some embodiments of the present disclosure provide a computer-readable storage medium. The computer-readable storage medium stores at least one instruction, at least one program, a code set, or an instruction set; wherein the at least one instruction, the at least one program, the code set, or the instruction set is executed and loaded by the processor to perform the method for generating the image parameter for the reproducible virtual character as described above.

Figure 10:
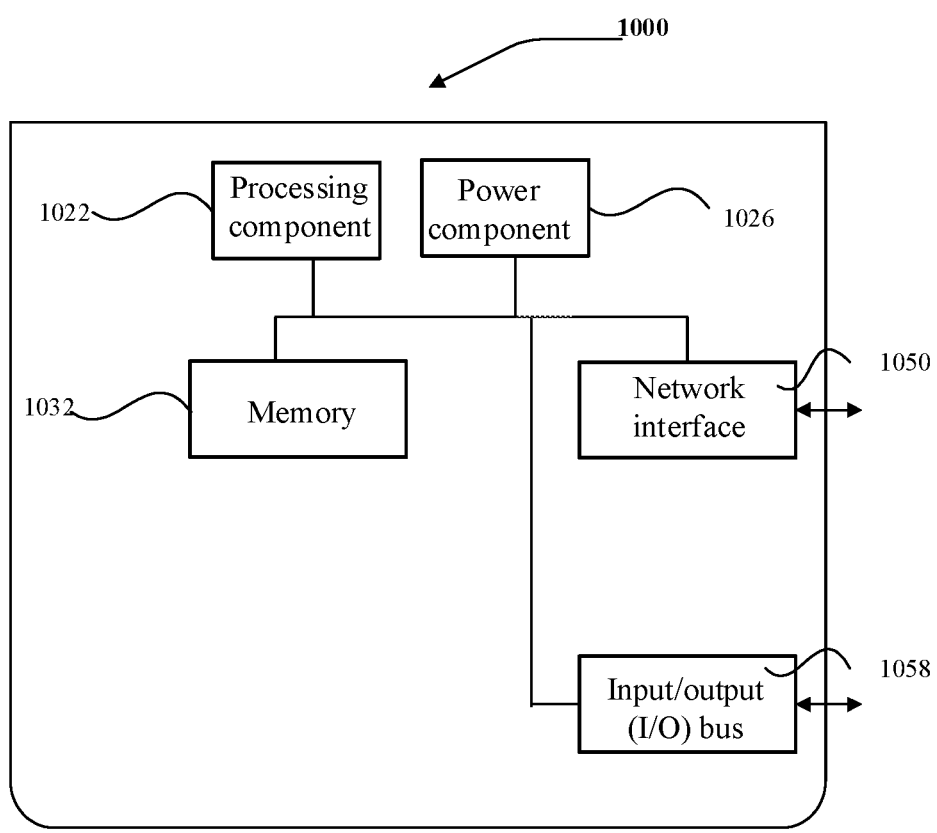
FIG. 10 is a block diagram of an apparatus for use in generating an image parameter for a reproducible virtual character according to some embodiments.

FIG. 10 is a block diagram of an apparatus 1000 for use in generating an image parameter for a reproducible virtual character according to some embodiments. For example, the apparatus 1000 may be provided as a server. Referring to FIG. 10, the apparatus 1000 includes a processing component 1022, and further includes one or more processors and a memory resource represented by a memory 1032, which is configured to store instructions that are executable by the processing component 1022, for example, applications. The application stored in the memory 1032 may include one or more modules that each corresponding to a group of instructions. In addition, the processing component 1022 is configured to execute instructions to perform the method for generating the image parameter for the reproducible virtual character as described above.

The apparatus 1000 may further include: a power component 1026 configured to perform power management for the apparatus 1000; a wired or wireless network interface 1050 is configured to connect the apparatus 1000 to network; and an input/output (I/O) bus 1058. The apparatus 1000 may run an operating system stored in the memory 1032, for example, Windows Server™, Mac OS X™, Unix™, Linux™, FreeBSD™, or the like.

In some implementations, if intergeneration of the virtual character is 0, the generating the gene sequence of the $i^{th}$ characteristic parameter in the n characteristic parameters according to the generation rule includes:

generating the gene sequence of the $i^{th}$ characteristic parameter in the n characteristic parameters according to an occurrence probability of each gene.

In some implementations, if intergeneration of the virtual character is greater than or equal to 1, the virtual character is a child virtual character, the image parameter is a child image parameter, the characteristic parameter is a first characteristic parameter, and the generating the gene sequence of the $i^{th}$ characteristic parameter in the n characteristic parameters according to the generation rule includes:

acquiring a father image parameter of a father virtual character and a mother image parameter of a mother virtual character, the father image parameter including n second characteristic parameters configured to indicate an image of the father virtual character, the mother image parameter including n third characteristic parameters configured to indicate an image of the mother virtual character; and generating a gene sequence of an $i^{th}$ first characteristic parameter in the n first characteristic parameters according to an $i^{th}$ second characteristic parameter and an $i^{th}$ third characteristic parameter and according to an inheritance rule.

In some implementations, the generating the gene sequence of the $i^{th}$ first characteristic parameter according to the $i^{th}$ second characteristic parameter and the $i^{th}$ third characteristic parameter and according to the inheritance rule includes:

determining an inheritance source of a $k^{th}$ gene in the $i^{th}$ first characteristic parameter according to the inheritance rule, k being a positive integer;

determining a $k^{th}$ gene in an $i^{th}$ second characteristic parameter as the $k^{th}$ gene in the $i^{th}$ first characteristic parameter if the inheritance source is the father virtual character; and determining a $k^{th}$ gene in an $i^{th}$ third characteristic parameter as the $k^{th}$ gene in the $i^{th}$ first characteristic parameter if the inheritance source is the mother virtual character.

In some implementations, if the gene sequence includes one dominant gene and at least one recessive gene, the method further includes:

upon obtaining the gene sequence, modifying the dominant gene to a recessive gene, and modifying one of the at least one recessive gene to a dominant gene.

In some implementations, the method further includes:

determining the $k^{th}$ gene in the $i^{th}$ first characteristic parameter satisfies a mutation condition if the inheritance source is the father virtual character and the $k^{th}$ gene in the $i^{th}$ second characteristic parameter is a mutated gene, or if the inheritance source is the mother virtual character and the $k^{th}$ gene in the $i^{th}$ third characteristic parameter is a mutated gene; and mutating the $k^{th}$ gene in the $i^{th}$ first characteristic parameter to a gene other than the $k^{th}$ gene in the $i^{th}$ second characteristic parameter and the $k^{th}$ gene in the $i^{th}$ third characteristic parameter if the $k^{th}$ gene in the $i^{th}$ first characteristic parameter satisfies the mutation condition.

In some implementations, if the mutated gene is a gene in a $j^{th}$ layer, the mutating the $k^{th}$ gene in the $i^{th}$ first characteristic parameter to the gene other than the $k^{th}$ gene in the $i^{th}$ second characteristic parameter and the $k^{th}$ gene in the $i^{th}$ third characteristic parameter includes:

mutating the $k^{th}$ gene in the $i^{th}$ first characteristic parameter to a gene in a $(j+1)^{th}$ layer, a minimum value of the gene in the $(j+1)^{th}$ layer being greater than a maximum value of a gene in the $j^{th}$ layer, j being a positive integer.

In some implementations, the method further includes:

acquiring the reproduction request, if the generation request is a reproduction request; and selecting the father virtual character and the mother virtual character from at least two virtual characters according to the reproduction request.

In some implementations, the method further includes:

assigning the child virtual character to a first user corresponding to the father virtual character or a second user corresponding to the mother virtual character.

In some implementations, the image of the virtual character includes n different types of image materials, each type of image materials being determined by a dominant gene in a gene sequence, the gene sequence including one dominant gene and at least one recessive gene.

In some implementations, if intergeneration of the virtual character is 0, the generating module is further configured to:

generate the gene sequence of the $i^{th}$ characteristic parameter in the n characteristic parameters according to an occurrence probability of each gene.

In some implementations, if intergeneration of the virtual character is greater than or equal to 1, the virtual character is a child virtual character, the image parameter is a child image parameter, the characteristic parameter is a first characteristic parameter, and the generating module is further configured to:

acquire a father image parameter of a father virtual character and a mother image parameter of a mother virtual character, the father image parameter including n second characteristic parameters configured to indicate an image of the father virtual character, the mother image parameter including n third characteristic parameters configured to indicate an image of the mother virtual character; and generate a gene sequence of an $i^{th}$ first characteristic parameter in the n first characteristic parameters according to an $i^{th}$ second characteristic parameter and an $i^{th}$ third characteristic parameter and according to an inheritance rule.

In some implementations, the generating module is further configured to:

determine an inheritance source of a $k^{th}$ gene in the $i^{th}$ first characteristic parameter according to the inheritance rule, k being a positive integer;

determine a $k^{th}$ gene in an $i^{th}$ second characteristic parameter as the $k^{th}$ gene in the $i^{th}$ first characteristic parameter if the inheritance source is the father virtual character; and determine a $k^{th}$ gene in an $i^{th}$ third characteristic parameter as the $k^{th}$ gene in the $i^{th}$ first characteristic parameter if the inheritance source is the mother virtual character.

In some implementations, if the gene sequence includes one dominant gene and at least one recessive gene, the generating module is further configured to:

upon obtaining the gene sequence, modify the dominant gene to a recessive gene, and modifying one of the at least one recessive gene to a dominant gene.

In some implementations, the generating module is further configured to:

determine the $k^{th}$ gene in the $i^{th}$ first characteristic parameter satisfies a mutation condition if the inheritance source is the father virtual character and the $k^{th}$ gene in the $i^{th}$ second characteristic parameter is a mutated gene, or if the inheritance source is the mother virtual character and the $k^{th}$ gene in the $i^{th}$ third characteristic parameter is a mutated gene; and mutate the $k^{th}$ gene in the $i^{th}$ first characteristic parameter to a gene other than the $k^{th}$ gene in the $i^{th}$ second characteristic parameter and the $k^{th}$ gene in the $i^{th}$ third characteristic parameter if the $k^{th}$ gene in the $i^{th}$ first characteristic parameter satisfies the mutation condition.

In some implementations, if the mutated gene is a gene in a $j^{th}$ layer, the generating module is further configured to:

mutate the $k^{th}$ gene in the $i^{th}$ first characteristic parameter to a gene in a $(j+1)^{th}$ layer, a minimum value of the gene in the $(j+1)^{th}$ layer being greater than a maximum value of a gene in the $j^{th}$ layer, j being a positive integer.

In some implementations, the apparatus further includes:

a second acquiring module, configured to acquire the reproduction request, if the generation request is a reproduction request; and a selecting module, configured to select the father virtual character and the mother virtual character from at least two virtual characters according to the reproduction request.

In some implementations, the apparatus further includes:

an assigning module, configured to assign the child virtual character to a first user corresponding to the father virtual character or a second user corresponding to the mother virtual character.

In some implementations, the image of the virtual character includes n different types of image materials, each type of image materials being determined by a dominant gene in a gene sequence, the gene sequence including one dominant gene and at least one recessive gene.

In another aspect of embodiments of the present disclosure, an apparatus for generating an image parameter for a reproducible virtual character is provided. The apparatus includes:

a processor; and memory for storing instructions executable by the processor;

wherein the processor is configured to:

receive a trigger signal for generating a virtual character, generation of the trigger signal being at least one of periodical generation and generation upon receipt of a generation request;

acquire a generation rule of an image parameter of the virtual character, the image parameter including n characteristic parameters configured to indicate an image of the virtual character, n being an integer;

generate a gene sequence of an $i^{th}$ characteristic parameter in the n characteristic parameters according to the generation rule, the gene sequence including m genes, m≥2, i≤n; and determine the image parameter of the virtual character according to the gene sequences of the n characteristic parameters.

Various embodiments of the present disclosure can have one of more the following advantages.

As an image of a virtual character is defined by an image parameter, and the image parameter includes n characteristic parameters, a gene sequence of an $i^{th}$ characteristic parameter in the n characteristic parameters may be firstly generated according to a generation rule, and then the image parameter of the virtual character may be determined according to the gene sequences of the n characteristic parameters. In this way, virtual characters having different images may be generated according to different gene sequences, that is, the images of the generated virtual characters are unanticipated, such that interest of generating the virtual characters is enhanced.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for generating an image parameter for a reproducible virtual character, the method comprising:
   receiving a trigger signal for generating a virtual character, generation of the trigger signal being at least one of periodical generation and generation upon receipt of a generation request;

acquiring a generation rule of an image parameter of the virtual character, the image parameter comprising n characteristic parameters configured to indicate an image of the virtual character, n being an integer;

generating a gene sequence of an $i^{th}$ characteristic parameter in the n characteristic parameters according to the generation rule, the gene sequence comprising m genes, m≥2, i≤n; and determining the image parameter of the virtual character according to the gene sequences of the n characteristic parameters.

2. The method according to claim 1, wherein in a case that intergeneration of the virtual character is 0, the generating the gene sequence of the $i^{th}$ characteristic parameter in the n characteristic parameters according to the generation rule comprises:

generating the gene sequence of the $i^{th}$ characteristic parameter in the n characteristic parameters according to an occurrence probability of each gene.

3. The method according to claim 1, wherein in a case that intergeneration of the virtual character is greater than or equal to 1, the virtual character is a child virtual character, the image parameter is a child image parameter, the characteristic parameter is a first characteristic parameter, and the generating the gene sequence of the $i^{th}$ characteristic parameter in the n characteristic parameters according to the generation rule comprises:

acquiring a father image parameter of a father virtual character and a mother image parameter of a mother virtual character, the father image parameter comprising n second characteristic parameters configured to indicate an image of the father virtual character, the mother image parameter comprising n third characteristic parameters configured to indicate an image of the mother virtual character; and generating a gene sequence of an $i^{th}$ first characteristic parameter in the n first characteristic parameters according to an $i^{th}$ second characteristic parameter and an $i^{th}$ third characteristic parameter and according to an inheritance rule.

4. The method according to claim 3, wherein the generating the gene sequence of the $i^{th}$ first characteristic parameter according to the $i^{th}$ second characteristic parameter and the $i^{th}$ third characteristic parameter and according to the inheritance rule comprises:

determining an inheritance source of a $k^{th}$ gene in the $i^{th}$ first characteristic parameter according to the inheritance rule, k being a positive integer;

determining a $k^{th}$ gene in an $i^{th}$ second characteristic parameter as the $k^{th}$ gene in the $i^{th}$ first characteristic parameter in a case that the inheritance source is the father virtual character; and determining a $k^{th}$ gene in an $i^{th}$ third characteristic parameter as the $k^{th}$ gene in the $i^{th}$ first characteristic parameter, in a case that the inheritance source is the mother virtual character.

5. The method according to claim 4, wherein in a case that the gene sequence comprises one dominant gene and at least one recessive gene, the method further comprises:

modifying the dominant gene to a recessive gene, and modifying one of the at least one recessive gene to a dominant gene, upon obtaining the gene sequence.

6. The method according to claim 4, further comprising:

determining the $k^{th}$ gene in the $i^{th}$ first characteristic parameter satisfies a mutation condition, in a case that the inheritance source is the father virtual character and the $k^{th}$ gene in the $i^{th}$ second characteristic parameter is a mutated gene, or in a case that the inheritance source is the mother virtual character and the $k^{th}$ gene in the $i^{th}$ third characteristic parameter is a mutated gene; and mutating the $k^{th}$ gene in the $i^{th}$ first characteristic parameter to a gene other than the $k^{th}$ gene in the $i^{th}$ second characteristic parameter and the $k^{th}$ gene in the $i^{th}$ third characteristic parameter in a case that the $k^{th}$ gene in the $i^{th}$ first characteristic parameter satisfies the mutation condition.

7. The method according to claim 6, wherein in a case that the mutated gene is a gene in a $j^{th}$ layer, the mutating the $k^{th}$ gene in the $i^{th}$ first characteristic parameter to the gene other than the $k^{th}$ gene in the $i^{th}$ second characteristic parameter and the $k^{th}$ gene in the $i^{th}$ third characteristic parameter comprises:

mutating the $k^{th}$ gene in the $i^{th}$ first characteristic parameter to a gene in a $(j+1)^{th}$ layer, a minimum value of the gene in the $(j+1)^{th}$ layer being greater than a maximum value of a gene in the $j^{th}$ layer, j being a positive integer.

8. The method according to claim 3, further comprising:

acquiring the reproduction request, in a case that the generation request is a reproduction request; and selecting the father virtual character and the mother virtual character from at least two virtual characters according to the reproduction request.

9. The method according to claim 3, further comprising:

assigning the child virtual character to a first user corresponding to the father virtual character or a second user corresponding to the mother virtual character.

10. The method according to claim 1, wherein the image of the virtual character comprises n different types of image materials, each type of image materials being determined by a dominant gene in a gene sequence, the gene sequence comprising one dominant gene and at least one recessive gene.

11. A terminal implementing the method of claim 1, comprising a display screen and a multimedia component, wherein the terminal is configured to display on the display screen virtual characters having different images generated according to different gene sequences, thereby having unanticipated images of the generated virtual characters to improve user experience.

12. An apparatus for generating an image parameter for a reproducible virtual character, the apparatus comprising:

a processor; and memory for storing instructions executable by the processor;

wherein the processor is configured to:

receive a trigger signal for generating a virtual character, generation of the trigger signal being at least one of periodical generation and generation upon receipt of a generation request;

acquire a generation rule of an image parameter of the virtual character, the image parameter comprising n characteristic parameters configured to indicate an image of the virtual character, n being an integer;

generate a gene sequence of an $i^{th}$ characteristic parameter in the n characteristic parameters according to the generation rule obtained by the first acquiring module, the gene sequence comprising m genes, m≥2, i≤n; and determine the image parameter of the virtual character according to the gene sequences of the n characteristic parameters generated by the generating module.

13. The apparatus according to claim 12, wherein in a case that intergeneration of the virtual character is 0, in order to generate the gene sequence of the $i^{th}$ characteristic parameter in the n characteristic parameters according to the generation rule, the processor is configured to:
generate the gene sequence of the $i^{th}$ characteristic parameter in the n characteristic parameters according to an occurrence probability of each gene.

14. The apparatus according to claim 12, wherein in a case that intergeneration of the virtual character is greater than or equal to 1, the virtual character is a child virtual character, the image parameter is a child image parameter, the characteristic parameter is a first characteristic parameter, and in order to generate the gene sequence of the $i^{th}$ characteristic parameter in the n characteristic parameters according to the generation rule, the processor is further configured to:
acquire a father image parameter of a father virtual character and a mother image parameter of a mother virtual character, the father image parameter comprising n second characteristic parameters configured to indicate an image of the father virtual character, the mother image parameter comprising n third characteristic parameters configured to indicate an image of the mother virtual character; and
generate a gene sequence of an $i^{th}$ first characteristic parameter in the n first characteristic parameters according to an $i^{th}$ second characteristic parameter and an $i^{th}$ third characteristic parameter and according to an inheritance rule.

15. The apparatus according to claim 14, wherein in order to generate the gene sequence of the $i^{th}$ first characteristic parameter according to the $i^{th}$ second characteristic parameter and the $i^{th}$ third characteristic parameter and according to the inheritance rule, the processor is further configured to:
determine an inheritance source of a $k^{th}$ gene in the $i^{th}$ first characteristic parameter according to the inheritance rule, k being a positive integer;
determine a $k^{th}$ gene in an $i^{th}$ second characteristic parameter as the $k^{th}$ gene in the $i^{th}$ first characteristic parameter in a case that the inheritance source is the father virtual character; and
determine a $k^{th}$ gene in an $i^{th}$ third characteristic parameter as the $k^{th}$ gene in the $i^{th}$ first characteristic parameter in a case that the inheritance source is the mother virtual character.

16. The apparatus according to claim 15, wherein in a case that the gene sequence comprises one dominant gene and at least one recessive gene, the processor is further configured to:
modify the dominant gene to a recessive gene, and modifying one of the at least one recessive gene to a dominant gene, upon obtaining the gene sequence.

17. The apparatus according to claim 15, wherein the processor is further configured to:
determine the $k^{th}$ gene in the $i^{th}$ first characteristic parameter satisfies a mutation condition in a case that the inheritance source is the father virtual character and the $k^{th}$ gene in the $i^{th}$ second characteristic parameter is a mutated gene, or in a case that the inheritance source is the mother virtual character and the $k^{th}$ gene in the $i^{th}$ third characteristic parameter is a mutated gene; and
mutate the $k^{th}$ gene in the $i^{th}$ first characteristic parameter to a gene other than the $k^{th}$ gene in the $i^{th}$ second characteristic parameter and the $k^{th}$ gene in the $i^{th}$ third characteristic parameter in a case that the $k^{th}$ gene in the $i^{th}$ first characteristic parameter satisfies the mutation condition.

18. The apparatus according to claim 17, wherein in order to mutate the $k^{th}$ gene in the $i^{th}$ first characteristic parameter to the gene other than the $k^{th}$ gene in the $i^{th}$ second characteristic parameter and the $k^{th}$ gene in the $i^{th}$ third characteristic parameter, in a case that the mutated gene is a gene in a $j^{th}$ layer, the processor is further configured to:
mutate the $k^{th}$ gene in the $i^{th}$ first characteristic parameter to a gene in a $(j+1)^{th}$ layer, a minimum value of the gene in the $(j+1)^{th}$ layer being greater than a maximum value of a gene in the $j^{th}$ layer, j being a positive integer.

19. The apparatus according to claim 14, wherein the processor is further configured to:
acquire the reproduction request, in a case that the generation request is a reproduction request; and
select the father virtual character and the mother virtual character from at least two virtual characters according to the reproduction request.

20. The apparatus according to claim 14, wherein the processor is further configured to:
assign the child virtual character to a first user corresponding to the father virtual character or a second user corresponding to the mother virtual character.

* * * * *